(12) United States Patent
Sugino

(10) Patent No.: US 8,439,782 B2
(45) Date of Patent: May 14, 2013

(54) AUTOMATIC TRANSMISSION

(75) Inventor: Soichi Sugino, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 269 days.

(21) Appl. No.: 12/953,482

(22) Filed: Nov. 24, 2010

(65) Prior Publication Data

US 2011/0124463 A1 May 26, 2011

(30) Foreign Application Priority Data

Nov. 25, 2009 (JP) .................................. 2009-267443
Jun. 10, 2010 (JP) .................................. 2010-132654

(51) Int. Cl.
*F16H 3/72* (2006.01)
*F16H 37/06* (2006.01)

(52) U.S. Cl.
USPC ................................ 475/5; 475/282; 475/295

(58) Field of Classification Search .................. 475/5, 6, 475/198, 151, 159, 221, 269, 275, 277, 279, 475/282, 283, 295, 330
See application file for complete search history.

(56) References Cited

U.S. PATENT DOCUMENTS

| 5,106,352 | A * | 4/1992 | Lepelletier | 475/280 |
| 8,075,436 | B2 * | 12/2011 | Bachmann | 475/5 |
| 2002/0082134 | A1 * | 6/2002 | Hirt et al. | 477/3 |
| 2009/0098968 | A1 * | 4/2009 | Maguire et al. | 475/5 |

FOREIGN PATENT DOCUMENTS

| JP | 2003-054278 | 2/2003 |
| JP | 2005-106266 | 4/2005 |
| JP | 2005-188612 | 7/2005 |
| JP | 2007-205466 | 8/2007 |

* cited by examiner

*Primary Examiner* — Justin Holmes
(74) *Attorney, Agent, or Firm* — Ditthavong Mori & Steiner, P.C.

(57) ABSTRACT

An automatic transmission includes an input shaft rotatable by power from a driving source. A transmission unit is capable of changing a speed of rotation of the input shaft to any one of speeds at gears. The transmission unit includes at least one planetary gear mechanism having three elements. An output member outputs the transferred power with a speed changed by the transmission unit. A transfer mechanism switches between a transfer state of power between a motor connection element and the output member and an open state of no transfer of power. The transfer mechanism is in the transfer state in a low-speed gear range and in the open state in a high-speed gear range.

20 Claims, 11 Drawing Sheets

FIG. 3A

|  | C1 | C2 | C3 | B1 | B2 | T1 | GEAR RATIO |
|---|---|---|---|---|---|---|---|
| Rvs |  |  | ○ |  | ○ | F | 3.468 |
| 1 | ○ |  |  |  | ○ | R | 4.681 |
| 2 | ○ |  |  | ○ | (○) | R | 2.888 |
| 3 | ○ |  | ○ |  | ○ | R | 1.904 |
| 4 | ○ | ○ |  |  | ○ | R | 1.338 |
| 5 | ○ | ○ | ○ |  |  | R | 1.112 |
| 6 |  | ○ | ○ |  | ○ | R | 0.905 |
| 7 |  | ○ | ○ | ○ |  | R | 0.831 |
| 8 |  | ○ |  | ○ | ○ | R | 0.718 |

FIG. 3B

| GEAR RATIO h | 1.666 |
|---|---|
| GEAR RATIO i | 2.200 |
| GEAR RATIO j | 1.750 |
| GEAR RATIO k | 2.000 |
| GEAR RATIO m | 1.083 |
| GEAR RATIO n | 1.128 |

FIG. 8

| SHIFT POSITION | VEHICLE STATE | | GEAR | C0 | C1 | C2 | C3 | B1 | T1 |
|---|---|---|---|---|---|---|---|---|---|
| P | REGENERATION | | | ○ | | | ○ | | R |
| R | ENG RUNNING | | Rvs | ○ | | | ○ | | F |
| D | EV RUNNING | | | (○) | ○ | | | | R |
| | ENG RUNNING | LOW-SPEED GEAR RANGE | 1 | ○ | ○ | | | | R (F) |
| | | | 2 | ○ | ○ | | | ○ | R |
| | | | 3 | ○ | ○ | | ○ | | R |
| | | | 4 | ○ | ○ | ○ | | | R |
| | | HIGH-SPEED GEAR RANGE | 5 | ○ | | ○ | ○ | | R |
| | | | 6 | ○ | | ○ | | ○ | R |

FIG. 11

| SHIFT POSITION | VEHICLE STATE | | GEAR | C1 | C2 | C3 | C4 | B1 | B2 |
|---|---|---|---|---|---|---|---|---|---|
| P | REGENERATION | | | | ○ | | | | |
| R | ENG RUNNING | | Rvs | | | ○ | | ○ | |
| D | EV RUNNING | | | ○ | | | | | |
| D | ENG RUNNING | LOW-SPEED GEAR RANGE | 1 | ○ | | | | | ○ |
| D | ENG RUNNING | LOW-SPEED GEAR RANGE | 2 | ○ | | | ○ | | |
| D | ENG RUNNING | LOW-SPEED GEAR RANGE | 3 | ○ | | ○ | | | |
| D | ENG RUNNING | LOW-SPEED GEAR RANGE | 4 | ○ | ○ | | | | |
| D | ENG RUNNING | HIGH-SPEED GEAR RANGE | 5 | | ○ | ○ | | | |
| D | ENG RUNNING | HIGH-SPEED GEAR RANGE | 6 | | ○ | | ○ | | |

AUTOMATIC TRANSMISSION

CROSS-REFERENCE TO RELATED APPLICATIONS

The present application claims priority under 35 U.S.C. §119 to Japanese Patent Application No. 2009-267443, filed Nov. 25, 2009, and Japanese Patent Application No. 2010-132654, filed Jun. 10, 2010, both entitled "Automatic Transmission". The contents of this application are incorporated herein by reference in their entirety.

BACKGROUND OF THE INVENTION

1. Field of the Invention

The present invention relates to an automatic transmission.

2. Discussion of the Background

There is a known automatic transmission capable of changing gears using a planetary gear mechanism in outputting power of an internal-combustion engine through an output member (see, for example, Japanese Unexamined Patent Application Publication (KOKAI) No. 2007-205466, in particular, FIG. 1).

For the automatic transmission described in Japanese Unexamined Patent Application Publication (KOKAI) No. 2007-205466, the output member is connected to driving wheels through a final driven gear, and the final driven gear is configured to receive a driving force from a motor through a speed reducer. With the aim of preventing excessive rotation of the motor when a vehicle runs at high speed, for example, an engagement mechanism made of a synchromesh mechanism capable of breaking connection between the motor and the final driven gear is interposed between the motor and the final driven gear.

For the above-described example, the engagement mechanism dedicated to the motor provided to prevent excessive rotation of the motor breaks connection between the motor and the final driven gear if the output member is rotated at high speed. Therefore, it is necessary to have a space for use in the engagement mechanism dedicated to the motor, and this limits size and weight reduction.

SUMMARY OF THE INVENTION

According to a first aspect of the present invention, an automatic transmission includes an input shaft, a transmission unit, an output member, and a transfer mechanism. The input shaft is rotatable by power from a driving source. The transmission unit is capable of changing a speed of rotation of the input shaft to any one of a plurality of speeds at gears. The transmission unit includes at least one planetary gear mechanism having three elements of a sun gear, a carrier, and a ring gear. One element among the three elements includes a transmission-unit output element to transfer the power. Another element among the three elements includes a motor connection element to receive power from a motor. The motor connection element is rotated at an equal speed or a lower speed compared with the input shaft at all the gears. The output member outputs the power transferred from the transmission-unit output element with a speed changed by the transmission unit. The transfer mechanism switches between a transfer state at which a transfer of power is performed between the motor connection element and the output member and an open state at which the transfer is not performed. The transfer mechanism is in the transfer state in a low-speed gear range from a first gear to a specific medium-speed gear among the gears to establish each of the gears in the low-speed gear range and in the open state in a high-speed gear range exceeding the specific medium-speed gear.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 3A and 3B illustrate how engagement mechanisms are engaged at each gear in the automatic transmission according to the first embodiment;

FIG. 8 illustrates how engagement mechanisms are engaged at each gear in the automatic transmission according to the third embodiment;

FIG. 11 illustrates how engagement mechanisms are engaged at each gear in the automatic transmission according to the fourth embodiment.

DESCRIPTION OF THE PREFERRED EMBODIMENTS

Figure 1:
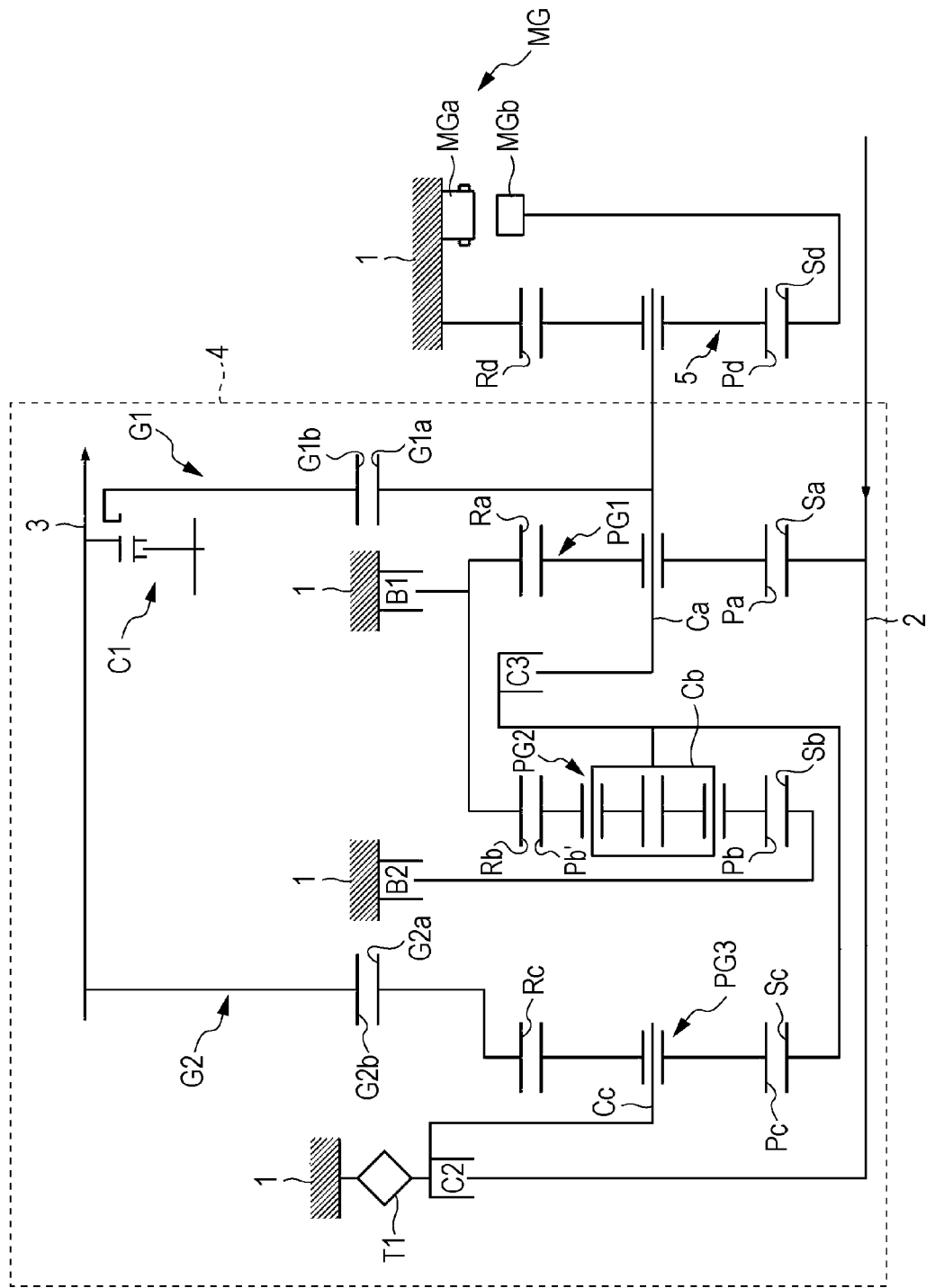
FIG. 1 is a schematic diagram of an automatic transmission according to a first embodiment of the present invention.

The embodiments will now be described with reference to the accompanying drawings, wherein like reference numerals designate corresponding or identical elements throughout the various drawings.

First Embodiment

FIG. 1 illustrates an automatic transmission according to a first embodiment of the present invention. The automatic transmission according to the first embodiment includes an input shaft 2, an output member 3, and a transmission unit 4. The input shaft 2 is rotatably supported in a transmission case 1 and is coupled to a driving source ENG (not illustrated) being an internal-combustion engine. The output member 3 is made of an output shaft arranged substantially in parallel with the input shaft 2. The transmission unit 4 is capable of changing the speed of rotation of the input shaft 2 to any one of a plurality of speeds at gears in transferring the rotation to the output member 3. Rotation of the output member 3 is transferred to the right and left driving wheels of the vehicle through a differential gear, a propeller shaft, and other components (not illustrated).

The transmission unit 4 includes a first planetary gear mechanism PG1, a second planetary gear mechanism PG2, and a third planetary gear mechanism PG3. Each of the first to third planetary gear mechanisms PG1 to PG3 includes three elements; the first planetary gear mechanism PG1 includes a sun gear Sa, a carrier Ca, and a ring gear Ra, the second planetary gear mechanism PG2 includes a sun gear Sb, a carrier Cb, and a ring gear Rb, and the third planetary gear mechanism PG3 includes a sun gear Sc, a carrier Cc, and a ring gear Rc. The first to third planetary gear mechanisms PG1 to PG3 are disposed substantially concentrically with the input shaft 2.

The first planetary gear mechanism PG1 is made of a single-pinion planetary gear mechanism made up of the sun gear Sa, the ring gear Ra, and the carrier Ca. The carrier Ca supports a pinion Pa meshing with the sun gear Sa and the ring gear Ra so as to allow it to rotate on its axis and revolve around the sun gear Sa.

Figure 2:
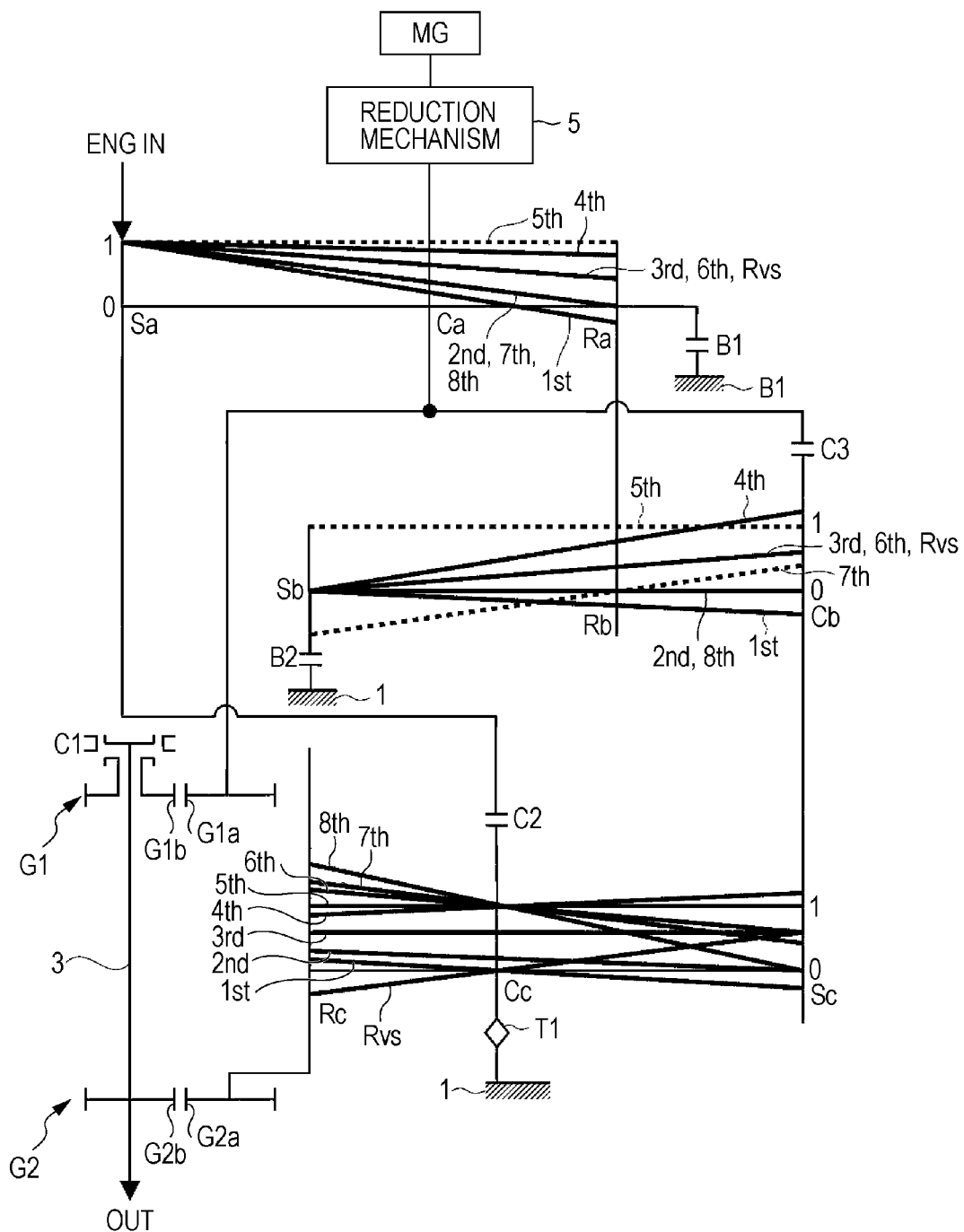
FIG. 2 is an alignment chart of the automatic transmission according to the first embodiment.

Referring to an alignment chart (a diagram that can depict ratios of relative rotational speeds of the three elements of the sun gear, carrier, and ring gear using straight lines (speed lines)) for the first planetary gear mechanism PG1 illustrated in the upper stage of FIG. 2, when the three elements of the first planetary gear mechanism PG1 arranged at intervals corresponding to the gear ratio (the ratio of the number of teeth of the ring gear to that of the sun gear) in the alignment chart are assigned as a first element, a second element, and a third element in sequence from the left, the first element is the sun gear Sa, the second element is the carrier Ca, and the third element is the ring gear Ra.

Here, the ratio between the interval between the sun gear Sa and the carrier Ca and that between the carrier Ca and the ring gear Ra is set at h:1, where h is the gear ratio of the first planetary gear mechanism PG1. In the alignment chart, the lower horizontal line represents that the rotational speed is "0" and the upper horizontal line represents that the rotational speed is "1", substantially the same as the rotational speed of the input shaft 2.

The second planetary gear mechanism PG2 is made of a double-pinion planetary gear mechanism made up of the sun gear Sb, the ring gear Rb, and the carrier Cb. The carrier Cb supports pinions Pb and Pb' so as to allow them to rotate on their axes and revolve around the sun gear Sb. The pinions Pb and Pb' mesh with each other; one of the pinions meshes with the sun gear Sb and the other meshes with the ring gear Rb.

Referring to an alignment chart for the second planetary gear mechanism PG2 illustrated in the middle stage of FIG. 2, when the three elements of the second planetary gear mechanism PG2 arranged at intervals corresponding to the gear ratio in the alignment chart are assigned as a fourth element, a fifth element, and a sixth element in sequence from the left, the fourth element is the sun gear Sb, the fifth element is the ring gear Rb, and the sixth element is the carrier Cb. The ratio between the interval between the sun gear Sb and the carrier Cb and that between the carrier Cb and the ring gear Rb is set at i:1, where i is the gear ratio of the second planetary gear mechanism PG2.

The third planetary gear mechanism PG1 is made of a single-pinion planetary gear mechanism made up of the sun gear Sc, the ring gear Rc, and the carrier Cc. The carrier Cc supports a pinion Pc meshing with the sun gear Sc and the ring gear Rc so as to allow it to rotate on its axis and revolve around the sun gear Sc.

Referring to an alignment chart for the third planetary gear mechanism PG3 illustrated in the lower stage of FIG. 2, when the three elements of the third planetary gear mechanism PG3 arranged at intervals corresponding to the gear ratio in the alignment chart are assigned as a seventh element, an eighth element, and a ninth element in sequence from the left, the seventh element is the ring gear Rc, the eighth element is the carrier Cc, and the ninth element is the sun gear Sc. The ratio between the interval between the sun gear Sc and the carrier Cc and that between the carrier Cc and the ring gear Rc is set at j:1, where j is the gear ratio of the third planetary gear mechanism PG3.

A hollow motor (motor generator) MG through which the input shaft 2 rotatably passes is disposed in the transmission case 1. The motor MG includes a stator MGa and a rotor MGb rotatably disposed within the stator MGa. The stator MGa is fixed to the transmission case 1 and generates a magnetic field by energization. The rotor MGb is rotatable by the effects of a magnetic field generated by the stator MGa.

The rotor MGb of the motor MG is coupled to the carrier Ca (second element) of the first planetary gear mechanism PG1 through a reduction mechanism 5. That is, the carrier Ca (second element) of the first planetary gear mechanism PG1 corresponds to a motor connection element of the first embodiment of the present invention. The reduction mechanism 5 is made of a single-pinion planetary gear mechanism made up of a sun gear Sd, a ring gear Rd, and a carrier Cd supporting a pinion Pd meshing with the sun gear Sd and the ring gear Rd so as to allow it to rotate on its axis and revolve around the sun gear Sd.

The sun gear Sd of the reduction mechanism 5 is coupled to the rotor MGb of the motor MG. The ring gear Rd of the reduction mechanism 5 is fixed to the transmission case 1. The carrier Cd of the reduction mechanism 5 is coupled to the carrier Ca of the first planetary gear mechanism PG1. Rotation of the motor MG is transferred to the carrier Ca of the first planetary gear mechanism PG1 in such a way that it is reduced to $1/(k+1)$ by the reduction mechanism 5, where k represents the gear ratio (the ratio of the number of the ring gear to that of the sun gear) of the reduction mechanism 5.

The transmission unit 4 of the automatic transmission according to the first embodiment includes a first gear train G1 and a second gear train G2. The first gear train G1 is made up of a first driving gear G1$a$ and a first driven gear G1$b$ meshing therewith. The second gear train G2 is made up of a second driving gear G2$a$ and a second driven gear G2$b$ meshing therewith.

The first driving gear G1$a$ is coupled to the carrier Ca (second element) of the first planetary gear mechanism PG1. The first driven gear G1$b$ is rotatably supported by the output member 3. The second driving gear G2$a$ is coupled to the ring gear Rc (seventh element) of the third planetary gear mechanism PG3. The second driven gear G2$b$ is fixed to the output member 3. The ring gear Rc (seventh element) of the third planetary gear mechanism PG3 corresponds to a transmission-unit output element of the first embodiment of the present invention.

The sun gear Sa (first element) of the first planetary gear mechanism PG1 is coupled to the input shaft 2. The ring gear Ra (third element) of the first planetary gear mechanism PG1 and the ring gear Rb (fifth element) of the second planetary gear mechanism PG2 being coupled to each other form a first coupling member Ra-Rb. The carrier Cb (sixth element) of the second planetary gear mechanism PG2 and the sun gear Sc (ninth element) of the third planetary gear mechanism PG3 being coupled to each other form a second coupling member Cb-Sc.

The automatic transmission according to the first embodiment has seven rotators in total based on the three planetary gear mechanisms of the first to third planetary gear mechanisms PG1 to PG3. The seven rotators are the sun gear Sa (first element) of the first planetary gear mechanism PG1, the carrier Ca (second element), the first coupling member Ra-Rb (third and fifth elements), the sun gear Sb (fourth element) of the second planetary gear mechanism PG2, the second coupling member Cb-Sc (sixth and ninth elements), the ring gear Rc (seventh element) of the third planetary gear mechanism PG3, and the carrier Cc (eighth element).

The automatic transmission according to the first embodiment includes, as an engagement mechanism, a first engagement mechanism C1, a second engagement mechanism C2, and a third engagement mechanism C3. The first engagement mechanism C1 is made of a meshing mechanism (e.g., a dog clutch) that can switch between a coupling state of coupling the first driven gear G1$b$ of the first gear train G1 and the output member 3 and an open state of decoupling them. The second engagement mechanism C2 is made of a wet multi-disc clutch that can switch between a coupling state of coupling the sun gear Sa (first element) of the first planetary gear mechanism PG1 and the carrier Cc (eighth element) of the third planetary gear mechanism PG3 and an open state of decoupling them. The third engagement mechanism C3 is made of a wet multi-disc clutch that can switch between a coupling state of coupling the carrier Ca (second element) of the first planetary gear mechanism PG1 and the second coupling member Cb-Sc and an open state of decoupling them. The first engagement mechanism C1 corresponds to a transfer mechanism of the first embodiment of the present invention.

The automatic transmission according to the first embodiment includes, as a fixing mechanism made of a wet multi-disc brake, a first fixing mechanism B1 and a second fixing mechanism B2. The first fixing mechanism B1 can switch between a fixing state of fixing the first coupling member Ra-Rb (third and fifth elements) to the transmission case 1 and an open state of releasing that fixation. The second fixing mechanism B2 can switch between a fixing state of fixing the sun gear Sb (fourth element) of the second planetary gear mechanism PG2 to the transmission case 1 and an open state of releasing that fixation.

The transmission case 1 is also coupled to a two-way clutch T1 that can switch between a reverse-rotation prohibited state at which normal rotation (rotation in a forward direction) of the carrier Cc (eighth element) of the third planetary gear mechanism PG3 is allowed and reverse rotation (rotation in a backward direction) thereof is prohibited and a normal-rotation prohibited state at which normal rotation of the carrier Cc is prohibited and reverse rotation thereof is allowed.

The transmission unit 4 according to the first embodiment is made up of the three planetary gear mechanisms of the first to third planetary gear mechanisms PG1 to PG3, the two gear trains of the first and second gear trains G1 and G2, the three engagement mechanisms of the first to third engagement mechanisms C1 to C3, the two fixing mechanisms of the first and second fixing mechanisms B1 and B2, and the two-way clutch T1.

Next, how each gear is established when power is transferred from the driving source being an internal-combustion engine (not illustrated) to the automatic transmission is described below.

With the automatic transmission according to the first embodiment, to establish the first gear, the first engagement mechanism C1 is set in a coupling state, the second fixing mechanism B2 is set in a fixing state, and the two-way clutch T1 is set in a reverse-rotation prohibited state. When the first engagement mechanism C1 is set in a coupling state, the ring gear Rc (seventh element) of the third planetary gear mechanism PG3 is rotated at n/m of the rotational speed of the carrier Ca (second element) of the first planetary gear mechanism PG1, where m is the gear ratio (the ratio of the number of teeth of the driven gear to that of the driving gear) of the first gear train G1 and n is the gear ratio of the second gear train G2.

The fixing state of the second fixing mechanism B2 sets the rotational speed of the sun gear Sb (fourth element) of the second planetary gear mechanism PG2 at "0", and the action of the two-way clutch T1 sets the rotational speed of the carrier Cc (eighth element) of the third planetary gear mechanism PG3 at "0".

Then, when the speed line for the three planetary gear mechanisms PG1 to PG3 is a line indicated with "1st" illustrated in FIG. 2, the output member 3 is rotated at 1/n of the rotational speed of the ring gear Rc (seventh element) of the third planetary gear mechanism PG3, and the first gear is thus established. If the two-way clutch T1 is set in a normal-rotation prohibited state, engine braking can be effected.

To establish the second gear, the first engagement mechanism C1 is set in a coupling state and the first fixing mechanism B1 is set in a fixing state. The fixing state of the first fixing mechanism B1 sets the rotational speed of the first coupling member Ra-Rb (third and fifth elements) at "0" and the rotational speed of the carrier Ca (second element) of the first planetary gear mechanism PG1 at 1/(h+1).

Then, the output member 3 is rotated at $1/\{m(h+1)\}$ being 1/m of the rotational speed of the carrier Ca (second element) of the first planetary gear mechanism PG1, and the second gear is thus established. If, in addition to the first engagement mechanism C1 and the first fixing mechanism B1, the second fixing mechanism B2 is fixed, friction loss can be reduced by the second fixing mechanism B2 and gear shifting between the first gear and the second gear can be achieved by simply switching the state of the first fixing mechanism B1. Thus gear shifting control can also be improved.

To establish the third gear, each of the first engagement mechanism C1 and the third engagement mechanism C3 is set in a coupling state, and the second fixing mechanism B2 is set in a fixing state. The coupling state of the third engagement mechanism C3 causes the carrier Ca (second element) of the first planetary gear mechanism PG1 and the second coupling member Cb-Sc (sixth and ninth elements) to be rotated at substantially the same rotational speed.

The fixing state of the second fixing mechanism B2 sets the rotational speed of the sun gear Sb (fourth element) of the second planetary gear mechanism PG2 at "0". The carrier Ca (second element) of the first planetary gear mechanism PG1 is rotated at i/(h+1) and the output member 3 is rotated at $i/\{m(h+i)\}$, and the third gear is thus established.

To establish the fourth gear, each of the first engagement mechanism C1 and the second engagement mechanism C2 is set in a coupling state, and the second fixing mechanism B2 is set in a fixing state. The coupling state of the second engagement mechanism C2 causes the carrier Cc (eighth element) of the third planetary gear mechanism PG3 to be rotated at "1", which is substantially the same as the rotational speed of the input shaft 2.

The fixing state of the second fixing mechanism B2 sets the rotational speed of the sun gear Sb (fourth element) of the second planetary gear mechanism PG2 at "0". The carrier Ca (second element) of the first planetary gear mechanism PG1 is rotated at $m\{h(i-1)(1+j)+i\}/\{im(h+1)+hnj(i-1)\}$ and the output member 3 is rotated at $\{h(i-1)(1+j)+i\}/\{im(h+1)+hnj(i-1)\}$, and the fourth gear is thus established.

To establish the fifth gear, each of the first engagement mechanism C1, the second engagement mechanism C2, and the third engagement mechanism C3 is set in a coupling state. The coupling state of the second engagement mechanism C2 causes the carrier Cc (eighth element) of the third planetary gear mechanism PG3 to be rotated at "1", which is substantially the same as the rotational speed of the input shaft 2.

The coupling state of the third engagement mechanism C3 causes the carrier Ca (second element) of the first planetary gear mechanism PG1 and the second coupling member Cb-Sc (sixth and ninth elements) to be rotated at substantially the same rotational speed. The carrier Ca (second element) of the first planetary gear mechanism PG1 is rotated at $\{m(1+j)\}/(m+jn)$ and the output member 3 is rotated at $(1+j)/(m+jn)$, and the fifth gear is thus established.

To establish the sixth gear, each of the second engagement mechanism C2 and the third engagement mechanism C3 is set in a coupling state, and the second fixing mechanism B2 is set in a fixing state. The coupling state of the second engagement mechanism C2 causes the carrier Cc (eighth element) of the third planetary gear mechanism PG3 to be rotated at "1", which is substantially the same as the rotational speed of the input shaft 2. The coupling state of the third engagement mechanism C3 causes the carrier Ca (second element) of the first planetary gear mechanism PG1 and the second coupling member Cb-Sc (sixth and ninth elements) to be rotated at substantially the same rotational speed. The ring gear Rc (seventh element) of the third planetary gear mechanism PG3 is rotated at $(jh+ji+h)/j(h+1)$ and the output member 3 is rotated at $(jh+ji+h)/jn(h+i)$, and the sixth gear is thus established.

To establish the seventh gear, each of the second engagement mechanism C2 and the third engagement mechanism C3 is set in a coupling state, and the first fixing mechanism B1 is set in a fixing state. The coupling state of the second engagement mechanism C2 causes the carrier Cc (eighth element) of the third planetary gear mechanism PG3 to be rotated at "1", which is substantially the same as the rotational speed of the input shaft 2. The coupling state of the third engagement mechanism C3 causes the carrier Ca (second element) of the first planetary gear mechanism PG1 and the second coupling member Cb-Sc (sixth and ninth elements) to be rotated at substantially the same rotational speed.

The fixing state of the first fixing mechanism B1 sets the rotational speed of the first coupling member Ra-Rb at "0". The rotational speed of the ring gear Rc (seventh element) of the third planetary gear mechanism PG3 is $(h+jh+j)/j(h+1)$. The output member 3 is rotated at $(h+jh+j)/jn(h+1)$, and the seventh gear is thus established.

To establish the eighth gear, the second engagement mechanism C2 is set in a coupling state, and each of the first fixing mechanism B1 and the second fixing mechanism B2 is set in a fixing state. The coupling state of the second engagement mechanism C2 causes the carrier Cc (eighth element) of the third planetary gear mechanism PG3 to be rotated at "1", which is substantially the same as the rotational speed of the input shaft 2. The fixing state of the first fixing mechanism B1 sets the rotational speed of the first coupling member Ra-Rb at "0".

The fixing state of the second fixing mechanism B2 sets the rotational speed of the sun gear Sb (fourth element) of the second planetary gear mechanism PG2 at "0". The three elements of the second planetary gear mechanism PG2 are in a locked state where relative rotation is disabled, and the rotational speed of the second coupling member Cb-Sc is also "0". The rotational speed of the ring gear Rc (seventh element) of the third planetary gear mechanism PG3 is $(j+1)/j$. The output member 3 is rotated at $(j+1)/nj$, and the eighth gear is thus established.

To establish the reverse gear, the third engagement mechanism C3 is set in a coupling state, the second fixing mechanism B2 is set in a fixing state, and the two-way clutch T1 is set in a normal-rotation prohibited state. The coupling state of the third engagement mechanism C3 causes the carrier Ca (second element) of the first planetary gear mechanism PG1 and the second coupling member Cb-Sc (sixth and ninth elements) to be rotated at substantially the same rotational speed. The fixing state of the second fixing mechanism B2 sets the rotational speed of the sun gear Sb (fourth element) of the second planetary gear mechanism PG2 at "0".

The action of the two-way clutch T1 sets the rotational speed of the carrier Cc (eighth element) of the third planetary gear mechanism PG3 at "0". The ring gear Rc (seventh element) of the third planetary gear mechanism PG3 is rotated reversely (i.e., in a direction in which a vehicle moves backward) at $i/\{j(h+i)\}$. The output member 3 is rotated at $i/\{nj(h+i)\}$, and the reverse gear is thus established.

The fifth gear corresponds to a specific medium-speed gear of the first embodiment of the present invention, the range from the first gear to the fifth gear corresponds to a low-speed gear range, and the range from the sixth gear to the eighth gear corresponds to a high-speed gear range.

The dotted speed lines illustrated in FIG. 2 indicate that, among the three planetary gear mechanisms PG1 to PG3, the planetary gear mechanism to which power is transferred causes the elements of the other planetary gear mechanisms to be rotated by following it.

FIG. 3A illustrates how each of the engagement mechanisms C1 to C3, the fixing mechanisms B1 and B2, and two-way clutch T1 is set at each gear according to the first embodiment. In the table, a circle indicates a coupling state or a fixing state, "F" indicates a normal-rotation prohibited state, "R" indicates a reverse-rotation prohibited state, and a circle surrounded by parentheses indicates that, although its coupling state is not essential to establishing gear, its coupling state may be preferable to reducing friction loss. Underlined "F" and "R" indicate that the action of the two-way clutch T1 sets the rotational speed of the carrier Cc (eighth element) of the third planetary gear mechanism PG3 at "0".

FIG. 3A also illustrates the gear ratio (the ratio of the rotational speed of the input shaft 2 to that of the output member 3) at each gear when the gear ratio h of the first planetary gear mechanism PG1 is 1,666, the gear ratio i of the second planetary gear mechanism PG2 is 2,200, the gear ratio j of the third planetary gear mechanism PG3 is 1,750, the gear ratio k of the reduction mechanism 5 is 2,000, the gear ratio m of the first gear train G1 is 1,083, and the gear ratio n of the second gear train G2 is 1,128, as illustrated in FIG. 3B.

With the automatic transmission according to the first embodiment, eight forward gears and one reverse gear can be achieved. In the high-speed gear range from the sixth gear to the eighth gear, the first engagement mechanism C1 is set in an open state. Therefore, rotation of the output member 3 being rotated at high speed can be prevented from being directly transferred to the motor MG. The carrier Ca (second element) of the first planetary gear mechanism PG1 coupled to the motor MG through the reduction mechanism 5 does not exceed the rotational speed of the driving source at all of the gears. Accordingly, excessive rotation of the motor MG can be prevented.

With the automatic transmission according to the first embodiment, the driving force of the motor MG can be transferred to the output member 3 at all of the gears. Therefore, hybrid electric vehicle (HEV) running in which the motor MG assists in the power of the driving source can be achieved at all of the gears. Additionally, at all of the gears, regeneration in which a secondary battery is charged through a power drive unit (PDU), which is not illustrated, by power generated by the motor MG by reducing the rotational speed of the carrier Ca (second element) of the first planetary gear mechanism PG1 can be achieved.

With the automatic transmission according to the first embodiment, rotation of the input shaft 2 is transferred to the output member 3 through the first gear train G1 or the second gear train G2. Therefore, the gear ratio at each gear can be readily changed by adjustment of the gear ratio m of the first gear train G1 and the gear ratio n of the second gear train G2. Accordingly, the degree of flexibility in setting the gear ratio at each gear can be improved.

The automatic transmission according to the first embodiment includes the two-way clutch T1 capable of fixing the carrier Cc (eighth element) of the third planetary gear mechanism PG3 to the transmission case 1. However, the two-way clutch T1 can be omitted. In this case, an automatic transmission capable of achieving seven forward gears of the second to eighth gears, from which the first gear in the first embodiment is removed, can be configured. The reverse gear can be established by causing the first engagement mechanism C1 to be in a coupling state and the motor MG to be reversely rotated.

In place of the two-way clutch T1, a one-way clutch allowing normal rotation (rotation occurring when a vehicle moves forward) of the carrier Cc (eighth element) of the third planetary gear mechanism PG3 and prohibiting reverse rotation (rotation occurring when a vehicle moves backward) of the carrier Cc can be used. Also in this case, the reverse gear can be established by causing the first engagement mechanism C1 to be in a coupling state and the motor MG to be reversely rotated.

When a one-way clutch is used in place of the two-way clutch T1, a third engagement mechanism capable of switching between a fixing state of fixing the carrier Cc (eighth element) of the third planetary gear mechanism PG3 to the transmission case 1 and an open state of releasing that fixation may be disposed substantially in parallel with the one-way clutch.

In that case, even with a driving source, such as an internal-combustion engine, the reverse gear can be established by causing the first engagement mechanism C1 to be in a coupling state and the third engagement mechanism to be in a fixing state. To establish the first gear, because the action of the one-way clutch sets the rotational speed of the carrier Cc (eighth element) of the third planetary gear mechanism PG3 at "0", the third engagement mechanism is used solely in establishing the reverse gear. Accordingly, an engaging pressure required to the third engagement mechanism can be small. Reduction in the size of the third engagement mechanism enables miniaturization of the automatic transmission.

The reduction mechanism 5 according to the first embodiment is made of a planetary gear mechanism. However, the reduction mechanism may be a gear train made up of a driving gear fixed to the rotation shaft of the motor MG and a driven gear whose number of teeth is greater than that of the driving gear.

Second Embodiment

Figure 4:
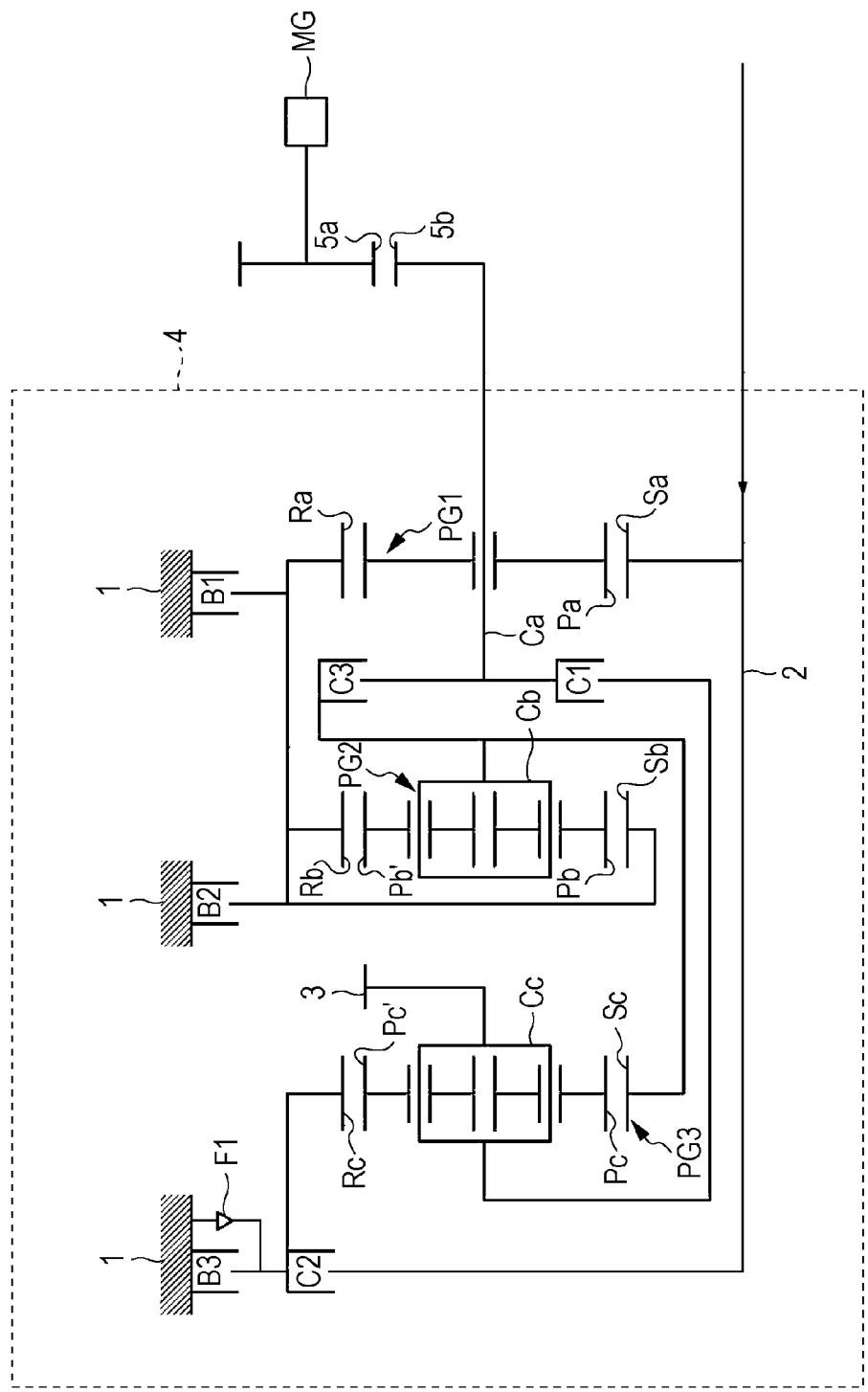
FIG. 4 is a schematic diagram of an automatic transmission according to a second embodiment of the present invention.

Next, an automatic transmission according to a second embodiment is described with reference to FIGS. 4 and 5. In the automatic transmission according to the second embodiment, the same reference numerals are used as in the first embodiment for similar components, and the description thereof is not repeated here.

For the automatic transmission according to the second embodiment, the output member 3 is made of an output gear, and the third planetary gear mechanism PG3 is of a double-pinion type. Referring to an alignment chart for the third planetary gear mechanism PG3 illustrated in the lower stage of FIG. 5, when the three elements of the third planetary gear mechanism PG3 arranged at intervals corresponding to the gear ratio in the alignment chart are assigned as a seventh element, an eighth element, and a ninth element in sequence from the left, the seventh element is the carrier Cc, the eighth element is the ring gear Rc, and the ninth element is the sun gear Sc.

The output member 3 being the output gear is coupled to the carrier Cc (seventh element). The carrier Cc (seventh element) corresponds to a transmission-unit output element of the second embodiment of the present invention.

The reduction mechanism 5 of the automatic transmission according to the second embodiment is made of a gear train made up of a reduction driving gear 5a and a reduction driven gear 5b meshing therewith. The reduction driving gear 5a is coupled to the rotor MGb of the motor MG, and the reduction driven gear 5b is coupled to the carrier Ca (second element).

The first engagement mechanism C1 of the automatic transmission according to the second embodiment is made of a wet multi-disc clutch.

For the automatic transmission according to the second embodiment, in place of the two-way clutch T1 of the first embodiment, a third fixing mechanism B3 capable of switching between a fixing state of fixing the ring gear Rc (eighth element) of the third planetary gear mechanism PG3 to the transmission case 1 and an open state of releasing that fixation is provided.

A one-way clutch F1 allowing normal rotation (rotation in a forward direction) of the ring gear Rc (eighth element) of the third planetary gear mechanism PG3 and prohibiting reverse rotation (rotation in a backward direction) is disposed substantially in parallel with the third fixing mechanism B3.

The transmission unit 4 according to the second embodiment is made up of the three planetary gear mechanisms of the first to third planetary gear mechanisms PG1 to PG3, the three engagement mechanisms of the first to third engagement mechanisms C1 to C3, the three fixing mechanisms of the first to third fixing mechanisms B1 to B3, and the one-way clutch F1.

With the automatic transmission according to the second embodiment, to establish the first gear, the first engagement mechanism C1 is set in a coupling state, and the second fixing mechanism B2 is set in a fixing state. When the first engagement mechanism C1 is set in a coupling state, the carrier Ca (second element) of the first planetary gear mechanism PG1 and the carrier Cc (seventh element) of the third planetary gear mechanism PG3 are coupled to each other and are rotated at substantially the same speed. The rotational speed of the ring gear Rc (eighth element) of the third planetary gear mechanism PG3 is set at "0" by the action of the one-way clutch F1.

Figure 5:
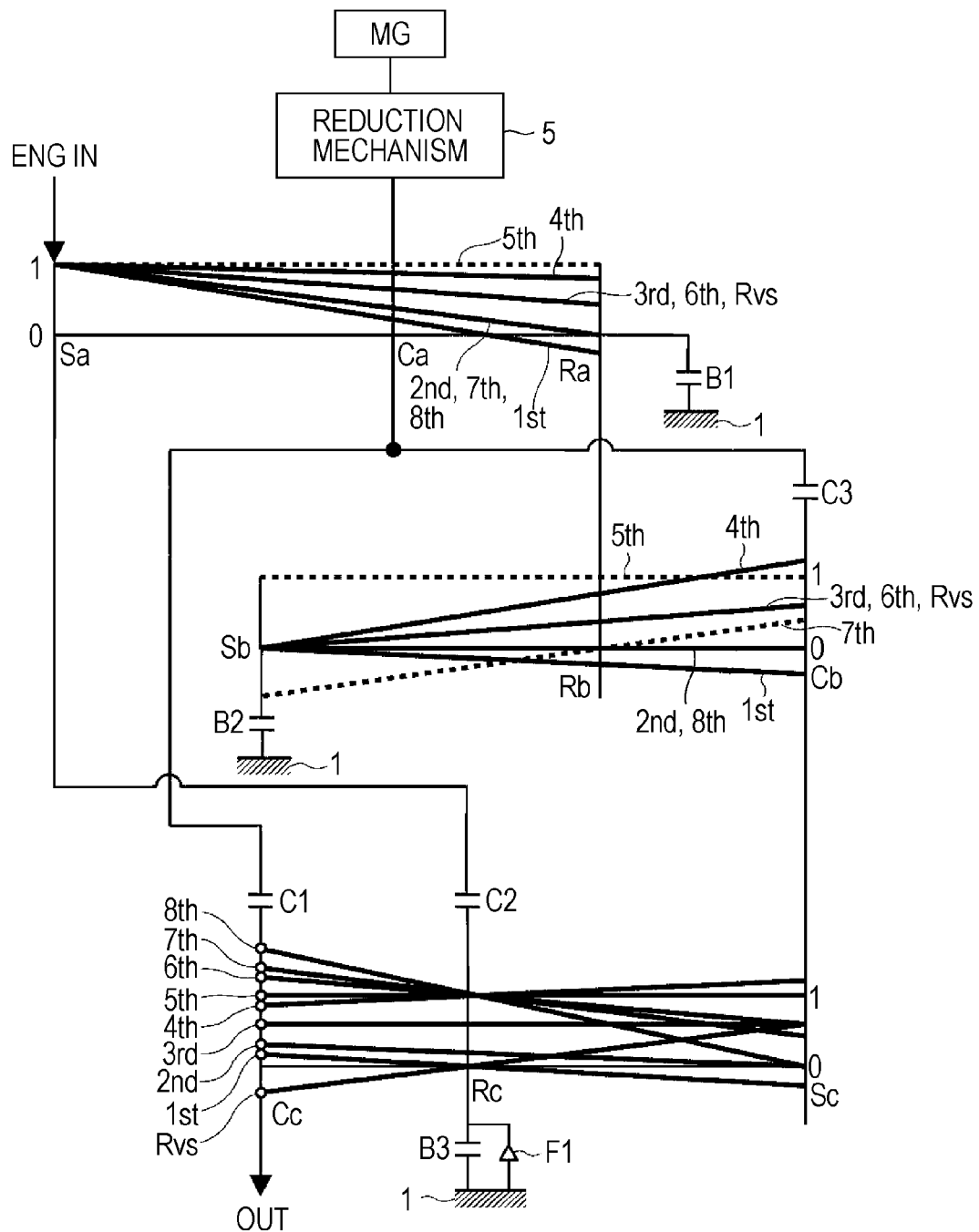
FIG. 5 is an alignment chart of the automatic transmission according to the second embodiment.

Then, the speed line for the three planetary gear mechanisms PG1 to PG3 is a line indicated by the "1st" illustrated in FIG. 5, the output member 3 is rotated by the carrier Cc (seventh element) of the third planetary gear mechanism PG3, and the first gear is thus established.

To establish the second gear, the first engagement mechanism C1 is set in a coupling state, and the first fixing mechanism B1 is set in a fixing state. At this time, the output member 3 is rotated at 1/(h+1), which is substantially the same as the rotational speed of the carrier Ca (second element) of the first planetary gear mechanism PG1, and the second gear is thus established.

To establish the third gear, each of the first engagement mechanism C1 and the third engagement mechanism C3 is set in a coupling state, and the second fixing mechanism B2 is set in a fixing state. At this time, the output member 3 is rotated at i/(h+i), which is substantially the same as the rotational speed of the carrier Ca (second element) of the first planetary gear mechanism PG1, and the third gear is thus established.

To establish the fourth gear, each of the first engagement mechanism C1 and the second engagement mechanism C2 is set in a coupling state, and the second fixing mechanism B2 is set in a fixing state. At this time, the output member 3 is rotated at $\{i+hj(i-1)\}/(1+hij-hj+h)$, which is substantially the same as the rotational speed of the carrier Ca (second element) of the first planetary gear mechanism PG1, and the fourth gear is thus established.

To establish the fifth gear, each of the first engagement mechanism C1, the second engagement mechanism C2, and the third engagement mechanism C3 is set in a coupling state. The coupling state of the second engagement mechanism C2 causes the ring gear Rc (eighth element) of the third planetary gear mechanism PG3 to be rotated at "1", which is substantially the same as the rotational speed of the input shaft 2.

The coupling state of the first engagement mechanism C1 causes the carrier Cc (seventh element) of the third planetary gear mechanism PG3 to be rotated at substantially the same rotational speed as that of the carrier Ca (second element) of the first planetary gear mechanism PG1. The coupling state of the third engagement mechanism C3 causes the second coupling member Cb-Sc to be rotated at substantially the same rotational speed as that of carrier Ca (second element) of the first planetary gear mechanism PG1. Therefore, the three elements of the third planetary gear mechanism PG3 are in a locked state where relative rotation is disabled, the output member 3 is rotated at "1", which is substantially the same as the rotational speed of the input shaft 2, and the fifth gear is thus established.

To establish the sixth gear, each of the second engagement mechanism C2 and the third engagement mechanism C3 is set in a coupling state, and the second fixing mechanism B2 is set in a fixing state. The coupling state of the second engagement mechanism C2 causes the ring gear Rc (eighth element) of the third planetary gear mechanism PG3 to be rotated at "1", which is substantially the same as the rotational speed of the input shaft 2. Then, the output member 3 is rotated at $(jh+ji-i)/\{(i-1)(h+1)\}$, and the sixth gear is thus established.

The fifth gear corresponds to a specific medium-speed gear of the second embodiment of the present invention, the range from the first gear to the fifth gear corresponds to a low-speed gear range, and the range from the sixth gear to the eighth gear, which is described below, corresponds to a high-speed gear range.

To establish the seventh gear, each of the second engagement mechanism C2 and the third engagement mechanism C3 is set in a coupling state, and the first fixing mechanism B1 is set in a fixing state. The coupling state of the second engagement mechanism C2 causes the ring gear Rc (eighth element) of the third planetary gear mechanism PG3 to be rotated at "1", which is substantially the same as the rotational speed of the input shaft 2. Then, the output member 3 is rotated at $(hj+j-i)/\{(j-1)(h+1)\}$, and the seventh gear is thus established.

To establish the eighth gear, the second engagement mechanism C2 is set in a coupling state, and each of the first fixing mechanism B1 and the second fixing mechanism B2 is set in a fixing state. The coupling state of the second engagement mechanism C2 causes the ring gear Rc (eighth element) of the third planetary gear mechanism PG3 to be rotated at "1", which is substantially the same as the rotational speed of the input shaft 2. Then, the three elements Sb, Cb, and Rb of the second planetary gear mechanism PG2 are in a locked state where relative rotation is disabled, the rotational speed of the second coupling member Cb-Sc is also "0", and the output member 3 is rotated at $j/(j-1)$. The eighth gear is thus established.

To establish the reverse gear, the third engagement mechanism C3 is set in a coupling state, and the second fixing mechanism B2 and the third fixing mechanism B3 are engaged. The fixing state of the third fixing mechanism B3 sets the rotational speed of the ring gear Rc (eighth element) of the third planetary gear mechanism PG3 at "0". Then, the output member 3 is rotated at $i/\{(j-1)(h+i)\}$, and the reverse gear is thus established.

With the automatic transmission according to the second embodiment, eight forward gears and one reverse gear can be achieved. In the high-speed gear range of the sixth gear or more, the first engagement mechanism C1 is set in an open state. Therefore, in the high-speed gear range, where the output member 3 is rotated at high speed, the rotation of the output member 3 is not directly transferred to the motor MG. Accordingly, excessive rotation of the motor MG resulting from the rotation of the output member 3 can be prevented.

With the automatic transmission according to the second embodiment, power of the motor MG can be transferred to the output member 3 at all of the gears. Therefore, assistance running in which the motor MG assists in the power of the driving source ENG can be achieved at all of the gears. Additionally, at all of the gears, regeneration in which a secondary battery is charged through a power drive unit (PDU), which is not illustrated, by power generated by the motor MG by reducing the rotational speed of the carrier Ca (second element) of the first planetary gear mechanism PG1.

The one-way clutch F1 according to the second embodiment can be omitted. In this case, the first gear can be established by causing the first fixing mechanism B1 to be in a fixing state.

Third Embodiment

An automatic transmission according to a third embodiment of the present invention is described with reference to FIGS. 6, 7, and 8. In the automatic transmission according to the third embodiment, the same reference numerals are used as in the first or second embodiment for similar components, and the description thereof is not repeated here.

For the automatic transmission according to the third embodiment, the output member 3 is made of an output gear, as in the second embodiment.

The transmission unit 4 includes two single-pinion planetary gear mechanisms of the first planetary gear mechanism PG1 and the second planetary gear mechanism PG2. Referring to an alignment chart for the first planetary gear mechanism PG1 illustrated in the middle stage of FIG. 7, when the three elements of the first planetary gear mechanism PG1 arranged at intervals corresponding to the gear ratio (the ratio of the number of the ring gear to that of the sun gear) in the alignment chart are assigned as a first element, a second element, and a third element in sequence from the left, the first element is the sun gear Sa, the second element is the carrier Ca, and the third element is the ring gear Ra.

Here, the ratio between the interval between the sun gear Sa and the carrier Ca and that between the carrier Ca and the ring gear Ra is set at h:1, where h is the gear ratio (the ratio of the number of the ring gear to that of the sun gear) of the first planetary gear mechanism PG1.

Figure 7:
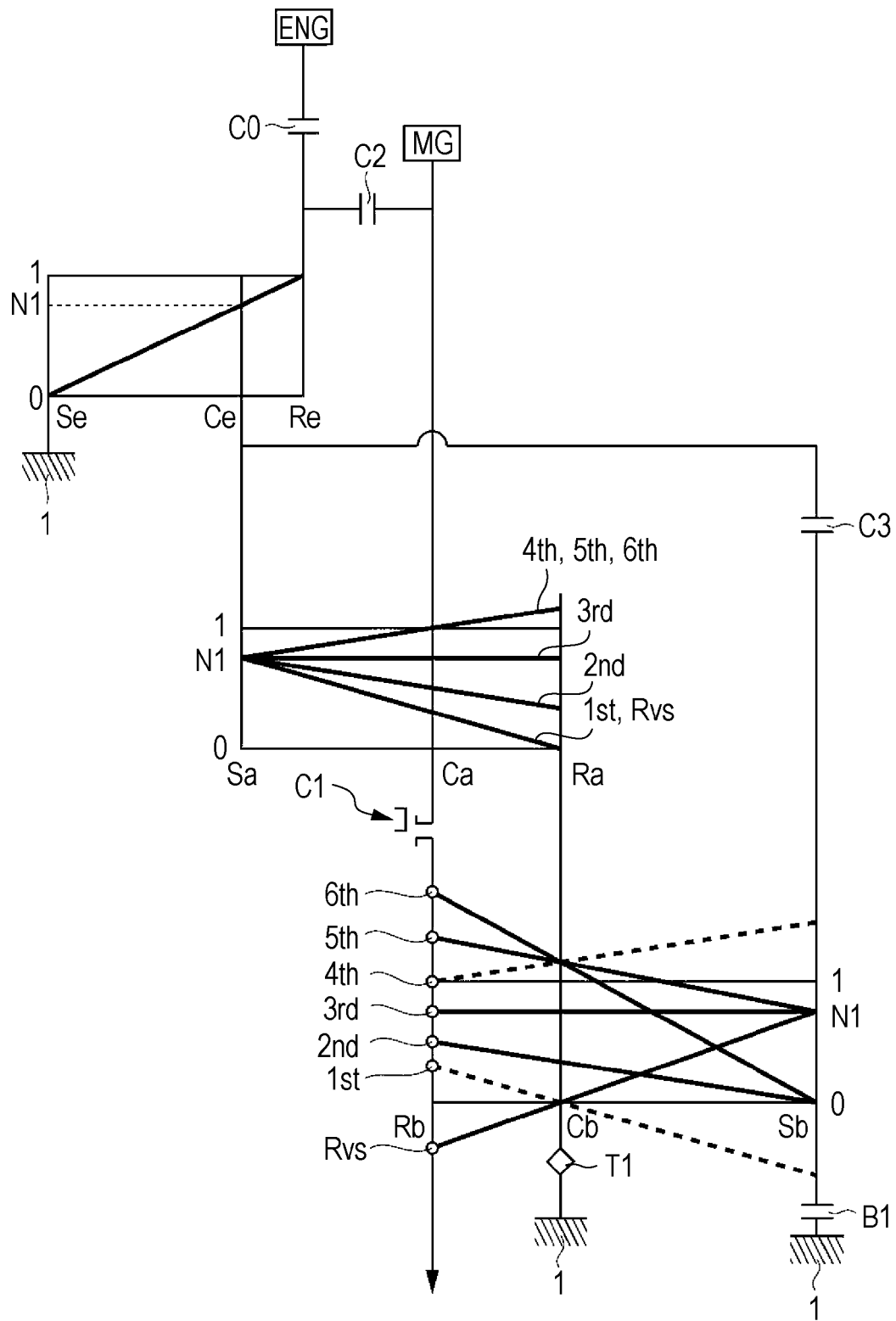
FIG. 7 is an alignment chart of the automatic transmission according to the third embodiment.

Referring to an alignment chart for the second planetary gear mechanism PG2 illustrated in the lower stage of FIG. 7, when the three elements of the second planetary gear mechanism PG2 arranged at intervals corresponding to the gear ratio in the alignment chart are assigned as a fourth element, a fifth element, and a sixth element in sequence from the left, the fourth element is the ring gear Rb, the fifth element is the carrier Ca, and the sixth element is the sun gear Sb. The ratio between the interval between the sun gear Sb and the carrier Cb and that between the carrier Cb and the ring gear Rb is set at i:1, where i is the gear ratio of the second planetary gear mechanism PG2.

The ring gear Ra (third element) of the first planetary gear mechanism PG1 and the carrier Cb (fifth element) of the second planetary gear mechanism PG2 being coupled to each other form a first coupling member Ra-Cb. The ring gear Rb of the second planetary gear mechanism PG2 is coupled to the output member 3 made of the output gear.

The hollow motor (motor generator) MG through which the input shaft 2 rotatably passes is disposed in the transmission case 1. The motor MG includes the stator MGa and the rotor MGb rotatably disposed within the stator MGa. The stator MGa is fixed to the transmission case 1 and generates a magnetic field by energization. The rotor MGb is rotatable by the effects of a magnetic field generated by the stator MGa.

The rotor MGb of the motor MG is coupled to the carrier Ca (second element) of the first planetary gear mechanism PG1. Rotation of the input shaft 2 is transferred to the sun gear Sa (first element) of the first planetary gear mechanism PG1 through an input unit 6.

The input unit 6 is made of a single-pinion planetary gear mechanism made up of a sun gear Se, a ring gear Re, and a carrier Ce. The carrier Ce supports a pinion Pe meshing with the sun gear Se and the ring gear Re so as to allow it to rotate on its axis and revolve around the sun gear Se. The sun gear Se of the input unit 6 is a fixed element fixed to the transmission case 1. The ring gear Re of the input unit 6 is an input element to which rotation of the input shaft 2 is transferred. The carrier Ce of the input unit 6 is an input-unit output element coupled to the sun gear Sa (first element) of the first planetary gear mechanism PG1.

Rotation of the input shaft 2 is transferred to the sun gear Sa (first element) of the first planetary gear mechanism PG1 in such a way that it is reduced to $g/(g+1)$ by the input unit 6, where g represents the gear ratio (the ratio of the number of the ring gear to that of the sun gear) of the input unit 6 and the rotational speed of the input shaft is "1".

The automatic transmission according to the third embodiment includes, as an engagement mechanism, a starting clutch C0 and the first engagement mechanism C1 (transfer mechanism). The starting clutch C0 can switch between a coupling state of coupling the input shaft 2 and the ring gear Re being the input element of the input unit 6 and an open state of decoupling them. The first engagement mechanism C1 can switch between a coupling state of coupling the carrier Ca (second element) of the first planetary gear mechanism PG1 and the output member 3 and an open state of decoupling them. The starting clutch C0 is made of a wet multi-disc clutch, whereas the first engagement mechanism C1 is made of a meshing mechanism, such as a dog clutch.

The automatic transmission according to the third embodiment also includes the second engagement mechanism C2 and the third engagement mechanism C3. The second engagement mechanism C2 can switch between a coupling state of coupling the carrier Ce being the output element of the input unit 6 and the carrier Ca (second element) of the first planetary gear mechanism PG1 and an open state of decoupling them. The third engagement mechanism C3 can switch between a coupling state of coupling the carrier Ce being the output element of the input unit 6 and the sun gear Sb (sixth element) of the second planetary gear mechanism PG2 and an open state of decoupling them. Each of the second engagement mechanism C2 and the third engagement mechanism C3 is made of a wet multi-disc clutch.

The automatic transmission according to the third embodiment also includes a first fixing mechanism T1 and a second fixing mechanism B1. The first fixing mechanism T1 can fix the carrier Cb (fifth element) of the second planetary gear mechanism PG2 to the transmission case 1. The second fixing mechanism B1 can switch between a fixing state of fixing the sun gear Sb (sixth element) of the second planetary gear mechanism PG2 to the transmission case 1 and an open state of releasing that fixation.

The first fixing mechanism T1 is made of a two-way clutch that can switch between a reverse-rotation prohibited state at which normal rotation (rotation occurring when a vehicle moves forward) of the carrier Cb (fifth element) is allowed and reverse rotation (rotation occurring when a vehicle moves backward) thereof is prohibited and a normal-rotation prohibited state at which normal rotation of the carrier Cb (fifth element) is prohibited and reverse rotation thereof is allowed. The second fixing mechanism B1 is made of a wet multi-disc brake. A damper D is disposed between the input shaft 2 and the starting clutch C0. The damper D absorbs variations of torque from the driving source, for example, an engine.

The transmission unit 4 according to the third embodiment is made up of the two planetary gear mechanisms of the first and second planetary gear mechanisms PG1 and PG2, the three engagement mechanisms of the first to third engagement mechanisms C1 to C3, and the two fixing mechanisms of the first and second fixing mechanisms T1 and B1.

Next, each gear of the automatic transmission according to the third embodiment having the above-described configuration is described. The starting clutch C0 is always in a coupling state when the vehicle is running and is switched to an open state in starting an engine by use of, for example, a starter motor (not illustrated).

With the automatic transmission according to the third embodiment, to establish the first gear, the first engagement mechanism C1 is set in a coupling state, and the first fixing mechanism T1 is set in a reverse-rotation prohibited state. This couples the carrier Ca (second element) of the first planetary gear mechanism PG1 and the ring gear Rb (fourth element) of the second planetary gear mechanism PG2 together, they are rotated at substantially the same speed, and the rotational speed of the first coupling member Ra-Cb is set at "0" by the action of the first fixing mechanism T1. The ring gear Rb (fourth element) of the second planetary gear mechanism PG2 coupled to the output member 3 is rotated at $g/\{(g+1)(h+1)\}$ being "1st" illustrated in FIG. 7, and the first gear is thus established.

The first engagement mechanism C1 is made of a dog clutch, and the first fixing mechanism T1 is made of a two-way clutch. Both of them cannot control slipping. Accordingly, to start the vehicle at the first gear, the engaging pressure of the starting clutch C0 is adjusted so as to prevent the driving source (not illustrated) from causing the engine to stall, and the amount of a transferred driving force from the driving source is controlled. Switching the first fixing mechanism T1 to a normal-rotation prohibited state during running at the first gear enables engine braking to be effected.

To establish the second gear, the first engagement mechanism C1 is set in a coupling state and the second fixing mechanism B1 is set in a fixing state. The carrier Ca (second element) of the first planetary gear mechanism PG1 and the ring gear Rb (fourth element) of the second planetary gear mechanism PG2 are coupled and rotated at substantially the same speed, and the rotational speed of the sun gear Sb (sixth element) of the second planetary gear mechanism PG2 is "0". The ring gear Rb (fourth element) of the second planetary gear mechanism PG2 coupled to the output member 3 is rotated at $g(i+1)/\{(g+1)(h+i+1)\}$ being "2nd" illustrated in FIG. 7, and the second gear is thus established.

To establish the third gear, each of the first engagement mechanism C1 and the third engagement mechanism C3 is set in a coupling state. The carrier Ca (second element) of the first planetary gear mechanism PG1 and the ring gear Rb (fourth element) of the second planetary gear mechanism PG2 are coupled and rotated at substantially the same speed, and the sun gear Sa (first element) of the first planetary gear mechanism PG1 and the sun gear Sb (sixth element) of the second planetary gear mechanism PG2 are coupled and rotated at substantially the same speed $g/(g+1)$. The ring gear Rb (fourth element) of the second planetary gear mechanism PG2 coupled to the output member 3 is also rotated at $g/(g+1)$ being "3nd", and the third gear is thus established.

To establish the fourth gear, each of the first engagement mechanism C1 and the second engagement mechanism C2 is set in a coupling state. The carrier Ca (second element) of the first planetary gear mechanism PG1 and the ring gear Rb (fourth element) of the second planetary gear mechanism PG2 are coupled and rotated at "1", which is substantially the same speed as that of the input shaft 2. The ring gear Rb (fourth element) of the second planetary gear mechanism PG2 coupled to the output member 3 is rotated at "1", which is substantially the same speed as that of the input shaft 2, and the fourth gear is thus established. At this time, the driving source, the motor MG, and the output member 3 are directly coupled.

To establish the fifth gear, each of the second engagement mechanism C2 and the third engagement mechanism C3 is set in a coupling state. The carrier Ca (second element) of the first planetary gear mechanism PG1 is rotated at "1", which is substantially the same speed as that of the input shaft 2. The sun gear Se (sixth element) of the second planetary gear mechanism PG2 is rotated at $g/(g+1)$, which is also referred to as "N1" below, being substantially the same speed as that of the sun gear Sa (first element) of the first planetary gear mechanism PG1. The ring gear Rb (fourth element) of the second planetary gear mechanism PG2 coupled to the output member 3 is rotated at "5th" illustrated in FIG. 7, and the fifth gear is thus established.

To establish the sixth gear, the second engagement mechanism C2 is set in a coupling state, and the second fixing mechanism B1 is set in a fixing state. The carrier Ca (second element) of the first planetary gear mechanism PG1 is rotated at "1", which is substantially the same as the rotational speed of the input shaft 2. The rotational speed of the sun gear Sb (sixth element) of the second planetary gear mechanism PG2 is "0". The ring gear Rb (fourth element) of the second planetary gear mechanism PG2 coupled to the output member 3 is rotated at "6th" illustrated in FIG. 7, and the sixth gear is thus established.

To establish the reverse gear, the third engagement mechanism C3 is set in a coupling state, and the first fixing mechanism T1 is set in a normal-rotation prohibited state. The sun gear Sa (first element) of the first planetary gear mechanism PG1 and the sun gear Sb (sixth element) of the second planetary gear mechanism PG2 are rotated at substantially the same speed $g/(g+1)$. The rotational speed of the carrier Cb (fifth element) of the second planetary gear mechanism PG2 is set at "0" by the action of the first fixing mechanism T1. The ring gear Rb (fourth element) of the second planetary gear mechanism PG2 coupled to the output member 3 is rotated at $-g/\{i(g+1)\}$ being "Rvs" illustrated in FIG. 7, and the reverse gear is thus established.

At all of the gears described above, hybrid electric vehicle (HEV) running in which the driving force of the motor MG assists in the driving force of the driving source and regeneration operation of charging a secondary battery (not illustrated) by power generated by the motor MG can be performed. To perform electric vehicle (EV) running in which a vehicle runs depending solely on the driving force of the motor MG, the first engagement mechanism C1 can be set in a coupling state, thus causing the motor MG and the output member 3 to be directly coupled to each other. At this time, if the starting clutch C0 is set in a coupling state, the driving source, for example, an engine, can be started using the driving force of the motor MG. When the vehicle is standing still, if each of the starting clutch C0 and the second engagement mechanism C2 is set in a coupling state, regeneration can be achieved by power generated by the motor MG using the driving force of the driving source, for example, an engine.

The dotted speed lines illustrated in FIG. 7 indicate that, of the planetary gear mechanisms PG1 and PG2, one planetary gear mechanism to which power is transferred causes the elements of the other planetary gear mechanism to be rotated by following it.

FIG. 8 illustrates how each of the engagement mechanisms C0 to C3 and fixing mechanisms T1 and B1 is set at each gear according to the third embodiment. In the table, a circle indicates a coupling state or a fixing state, "F" and "R" in the column T1 indicates a normal-rotation prohibited state and a reverse-rotation prohibited state, respectively.

At the first gear, in effecting engine braking, because the first fixing mechanism T1 is switched from a reverse-rotation prohibited state to a normal-rotation prohibited state, "R(F)" is shown. The underlined letters in the column T1 indicate that the rotational speed of the carrier Cb (fifth element) of the second planetary gear mechanism PG2 is set at "0" by the action of the first fixing mechanism T1.

For the third embodiment, the fourth gear corresponds to a specific medium-speed gear, the range from the first gear to the fourth gear corresponds to a low-speed gear range, and the fifth and sixth gears correspond to a high-speed gear range.

With the automatic transmission according to the third embodiment, six forward gears and one reverse gear can be achieved. In the high-speed gear range of the fifth and sixth gears, where the output member 3 is rotated at a rotational speed higher than or equal to that of the driving source, the first engagement mechanism C1 is in an open state. Therefore, in the high-speed gear range, the rotational speed of the output member 3 can be prevented from being directly transferred to the motor MG. Additionally, at all of the first to sixth gears, the rotational speed of the carrier Ca (second element) of the first planetary gear mechanism PG1 to which the driving force of the motor MG is transferred is smaller than or equal to that of the input shaft 2 being rotated by the driving source.

Accordingly, with the automatic transmission according to the third embodiment, excessive rotation of the motor MG can be prevented.

For the third embodiment, in transferring rotation of the input shaft 2 to the sun gear Sa (first element) of the first planetary gear mechanism PG1, the rotational speed of the input shaft 2 is reduced by the input unit 6. However, the rotational speed of the input shaft 2 may be increased by the input unit 6 in transferring such rotation to the sun gear Sa (first element) of the first planetary gear mechanism PG1. In this case, for example, the carrier Ce of the input unit 6 can be the input element, the ring gear Re can be the output element, and the sun gear Se can be the fixed element.

The input unit 6 may be omitted, and rotation of the input shaft 2 may be transferred to the sun gear Sa (first element) of the first planetary gear mechanism PG1 without changing its rotational speed.

The first fixing mechanism T1 may be made of a wet multi-disc brake, instead of a two-way clutch. However, with a two-way clutch, friction loss can be more reduced.

When the first fixing mechanism T1 is made of a wet multi-disc brake, it is not necessary to have the starting clutch C0.

For the automatic transmission according to the third embodiment, the starting clutch C0 can switch between a coupling state of coupling the input shaft 2 and the ring gear Re being the input element of the input unit 6 and an open state of decoupling them. However, the starting clutch C0 of the third embodiment of the present invention is not limited to the above-described example.

For example, the starting clutch C0 may be made of an engagement mechanism (clutch) capable of switching between a coupling state of coupling the carrier Ce being the output element of the input unit 6 and the sun gear Sa (first element) of the first planetary gear mechanism PG1 of the transmission unit 4 and an open state of decoupling them. Alternatively, the starting clutch C0 may be made of a fixing mechanism (brake) capable of switching between a fixing state of fixing the sun gear Se being the fixed element of the input unit 6 to the transmission case 1 and an open state of releasing that fixation. Even if the starting clutch is configured in such a way, the amount of a driving force transferred from the driving source to the sun gear Sa (first element) of the first planetary gear mechanism PG1 of the transmission unit 4 can be controlled by adjustment of the engaging pressure of the starting clutch.

Figure 6:
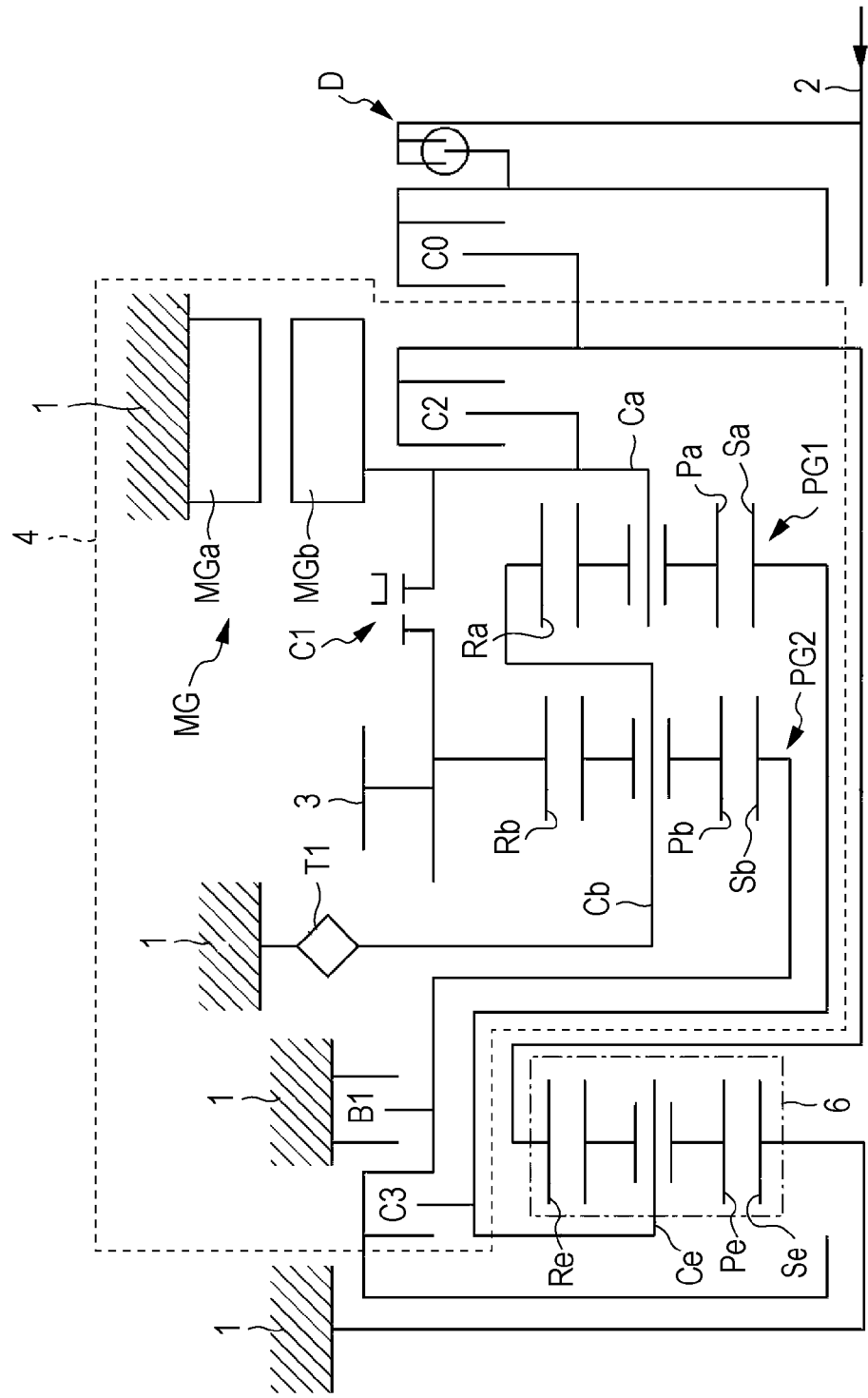
FIG. 6 is a schematic diagram of an automatic transmission according to a third embodiment of the present invention.

In FIG. 6, which illustrates the automatic transmission according to the third embodiment, the damper D and the starting clutch C0 are arranged to the right of the automatic transmission. However, they may be arranged to the left thereof.

Fourth Embodiment

Figure 9:
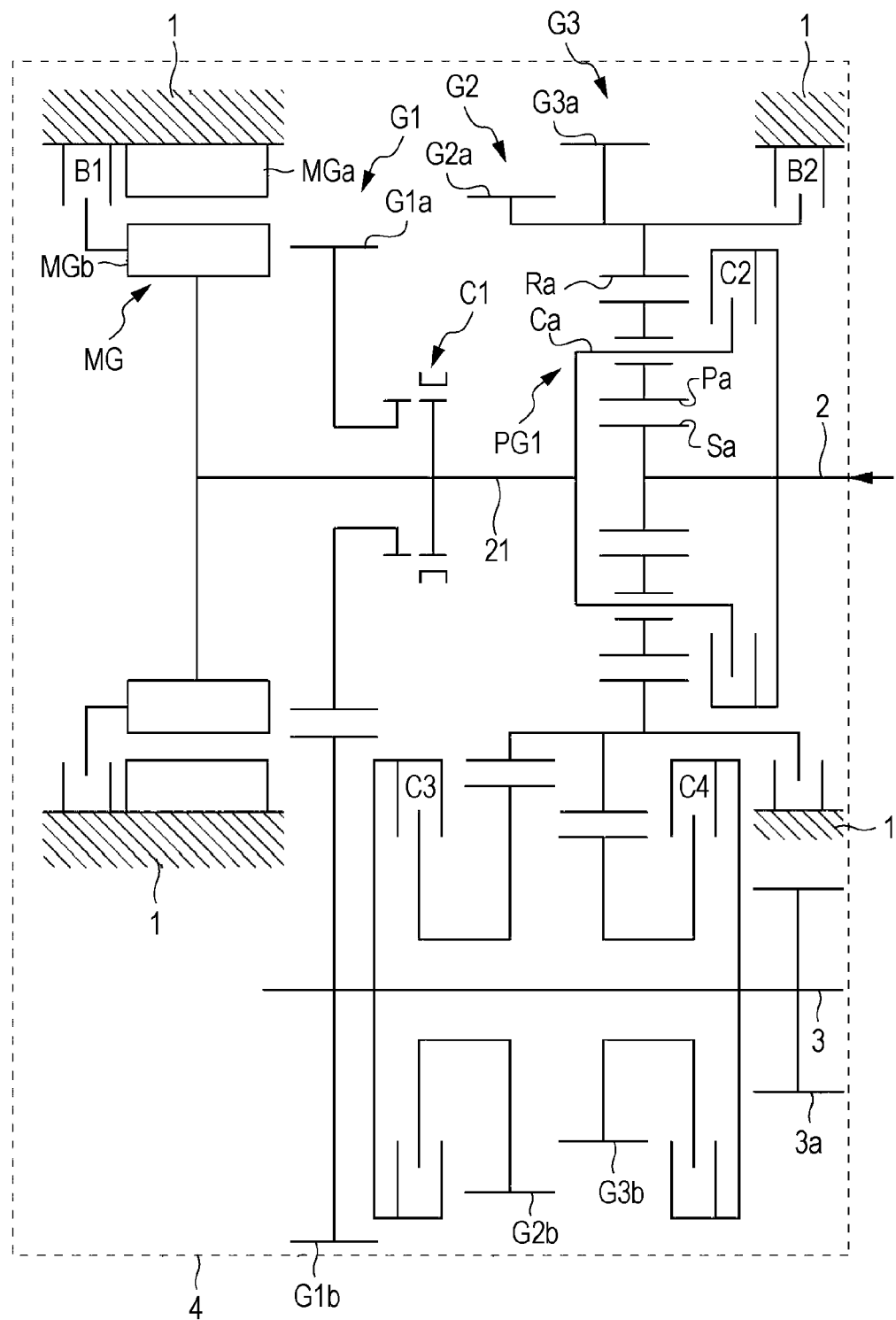
FIG. 9 is a schematic diagram of an automatic transmission according to a fourth embodiment of the present invention.

An automatic transmission according to a fourth embodiment of the present invention is described with reference to FIGS. 9, 10, and 11. In the automatic transmission according to the fourth embodiment, the same reference numerals are used as in the first, second, or third embodiment for similar components, and the description thereof is not repeated here.

The output member 3 according to the fourth embodiment is made of an output shaft arranged substantially in parallel with the input shaft 2. An output gear 3a meshing with a final driven gear (not illustrated) is fixed to the output member 3.

The transmission unit 4 according to the fourth embodiment includes the single planetary gear mechanism PG1 and three gear trains of the first, second, and third gear trains G1, G2, and G3. The first gear train G1 includes the first driving gear G1a and the first driven gear G1b meshing therewith; the second gear train G2 includes the second driving gear G2a and the second driven gear G2b meshing therewith; and the third gear train G3 includes a third driving gear G3a and a third driven gear G3b meshing therewith. The gear ratios are set so as to satisfy the relationship a<b<c, where "a" indicates the gear ratio (the ratio of the number of teeth of the driven gear to that of the driving gear) of the first gear train G1, "b" indicates the gear ratio of the second gear train G2, and "c" indicates the gear ratio of the third gear train G3.

The gear ratio a of the first gear train G1 is set so as to reduce the rotational speed of a coupling shaft 21 in transferring the rotation thereof to the output member 3. The gear ratios b and c of the second and third gear trains G2 and G3, respectively, are set so as to increase the rotational speed of the ring gear Ra of the first planetary gear mechanism PG1 in transferring the rotation thereof to the output member 3.

The first planetary gear mechanism PG1 is made of a single-pinion type made up of the sun gear Sa, the ring gear Ra, and the carrier Ca. The carrier Ca supports the pinion Pa meshing with the sun gear Sa and the ring gear Ra so as to allow it to rotate on its axis and revolve around the sun gear Sa.

Figure 10:
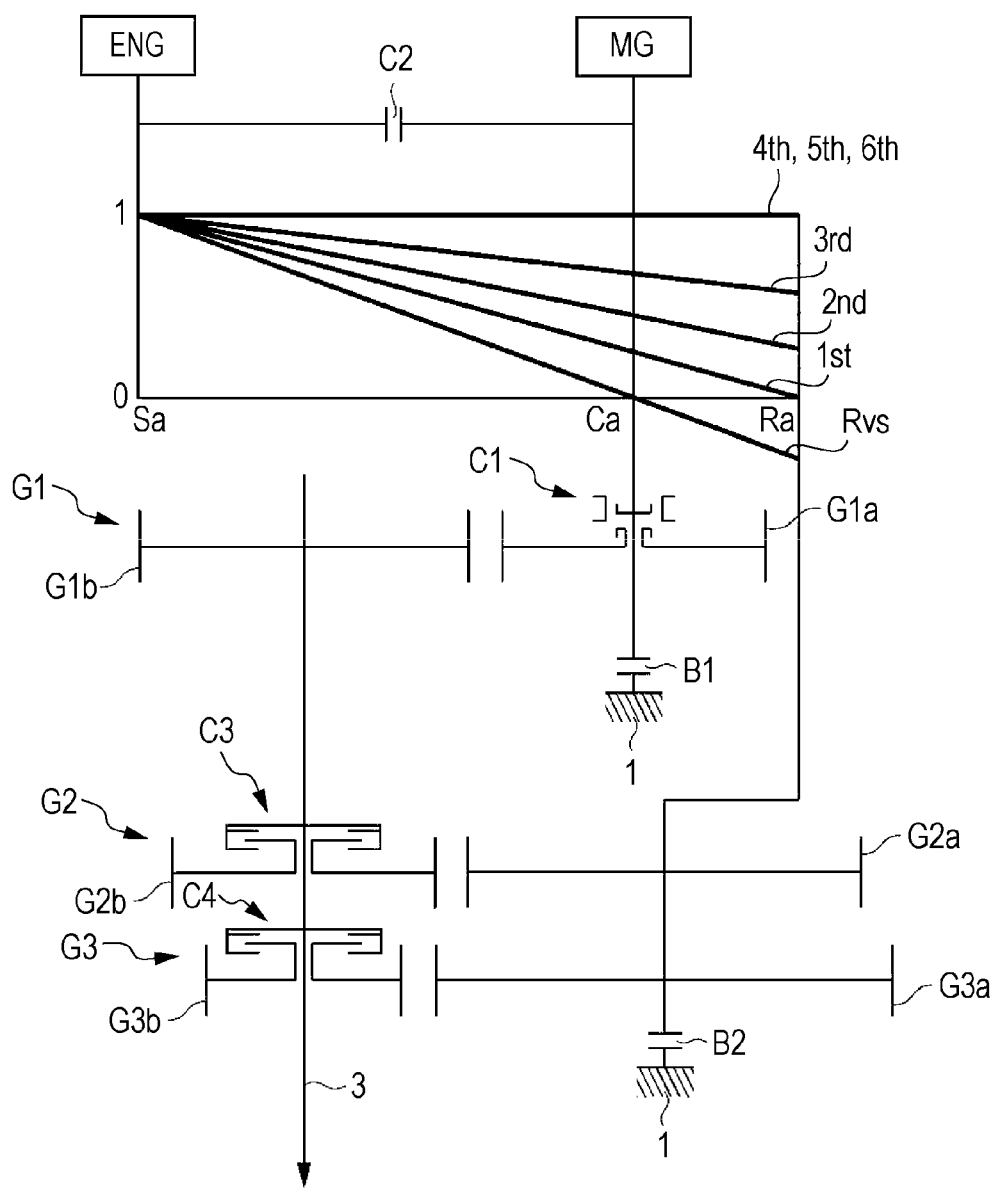
FIG. 10 is an alignment chart of the automatic transmission according to the fourth embodiment.

Referring to an alignment chart for the first planetary gear mechanism PG1 illustrated in FIG. 10, when the three elements of the first planetary gear mechanism PG1 arranged at intervals corresponding to the gear ratio in the alignment chart are assigned as a first element, a second element, and a third element in sequence from the left, the first element is the sun gear Sa, the second element is the carrier Ca, and the third element is the ring gear Ra.

The sun gear Sa of the first planetary gear mechanism PG1 is coupled to the input shaft 2. The carrier Ca of the first planetary gear mechanism PG1 is coupled to the rotor MGb of the motor MG through the coupling shaft 21 disposed substantially concentrically with the input shaft 2.

The first driving gear G1a of the first gear train G1 is rotatably supported by the coupling shaft 21. The first driven gear G1b meshing with the first driving gear G1a is fixed to the output member 3 being the output shaft.

The second driving gear G2a of the second gear train G2 and the third driving gear G3a of the third gear train G3 are fixed to the ring gear Ra of the first planetary gear mechanism PG1. The second driven gear G2b meshing with the second driving gear G2a and the third driven gear G3b meshing with the third driving gear G3a are rotatably supported by the output member 3.

The automatic transmission according to the fourth embodiment includes, as an engagement mechanism, the first engagement mechanism C1, the second engagement mechanism C2, the third engagement mechanism C3, and a fourth engagement mechanism C4. The first engagement mechanism C1 is made of a mechanism (e.g., a synchromesh mechanism, a dog clutch) that can switch between a coupling state of fixing the first driving gear G1a to the coupling shaft 21 and an open state of releasing that fixation. The second engagement mechanism C2 can switch between a coupling state of coupling the sun gear Sa and the carrier Ca of the first planetary gear mechanism PG1 and an open state of decoupling them. The third engagement mechanism C3 can switch between a coupling state of fixing the second driven gear G2b to the output member 3 made of the output shaft and an open state of releasing that fixation. The fourth engagement mechanism C4 can switch between a coupling state of fixing the third driven gear G3b to the output member 3 and an open state of releasing that fixation.

The automatic transmission according to the fourth embodiment also includes the first fixing mechanism B1 and the second fixing mechanism B2. The first fixing mechanism B1 can switch between a fixing state of fixing the rotor MGb to the transmission case 1 and an open state of releasing that fixation. The second fixing mechanism B2 can switch a fixing state of fixing the ring gear Ra of the first planetary gear mechanism PG1 to the transmission case 1 and an open state of releasing that fixation.

The transmission unit 4 according to the fourth embodiment is made up of the planetary gear mechanism PG1, the three gear trains of the first to third gear trains G1 to G3, the four engagement mechanisms of the first to fourth engagement mechanisms C1 to C4, and the two fixing mechanisms of the first and second fixing mechanisms B1 and B2.

Next, how the automatic transmission according to the fourth embodiment establishes each gear using the driving source ENG being an internal-combustion engine is described.

To establish the first gear, the first engagement mechanism C1 is set in a coupling state, and the second fixing mechanism B2 is set in a fixing state. The first driving gear G1a is fixed to the coupling shaft 21. The ring gear Ra of the first planetary gear mechanism PG1 is fixed to the transmission case 1, and its rotational speed is "0".

Rotation of the input shaft 2 having a rotational speed reduced to $1/(h+1)$, where h is the gear ratio of the first planetary gear mechanism PG1 (the ratio of the number of teeth of the ring gear Ra to that of the sun gear Sa), is transferred to the first driving gear G1a through the coupling shaft 21. Because the gear ratio of the first gear train G1 is "a", the output member 3 is rotated at the rotational speed $1/\{a(h+1)\}$, and the first gear is thus established.

To establish the second gear, each of the first engagement mechanism C1 and the fourth engagement mechanism C4 is set in a coupling state. The first driving gear G1a is fixed to the coupling shaft 21, and the third driven gear G3b is fixed to the output member 3 being the output shaft.

Because the gear ratio of the third gear train G3 is "c", the output member 3 is rotated at $1/\{h(a-c)+a\}$, and the second gear is thus established.

To establish the third gear, each of the first engagement mechanism C1 and the third engagement mechanism C3 is set in a coupling state. The first driving gear G1a is fixed to the coupling shaft 21, and the second driven gear G2b is fixed to the output member 3. Because the gear ratio of the second gear train G2 is "b", the output member 3 is rotated at $1/\{h(a-b)+a\}$, and the third gear is thus established.

To establish the fourth gear, each of the first engagement mechanism C1 and the second engagement mechanism C2 is set in a coupling state. When the second engagement mechanism C2 is set in a coupling state, the input shaft 2 and the rotor MGb of the motor MG are directly coupled to through the carrier Ca of the first planetary gear mechanism PG1 and the coupling shaft 21. The rotational speed of the input shaft 2 is changed to 1/a, the output member 3 is rotated, and the fourth gear is thus established.

To establish the fifth gear, each of the second engagement mechanism C2 and the third engagement mechanism C3 is set in a coupling state. When the second engagement mechanism C2 is set in a coupling state, the sun gear Sa and the carrier Ca of the first planetary gear mechanism PG1 are coupled, and the three elements of the sun gear Sa, carrier Ca, and ring gear Ra are in a locked state at which relative rotation is disabled. The coupling state of the third engagement mechanism C3 fixes the second driven gear G2b to the output member 3. The rotational speed of the input shaft 2 is changed to 1/b, the output member 3 is rotated, and the fifth gear is thus established.

To establish the sixth gear, each of the second engagement mechanism C2 and the fourth engagement mechanism C4 is set in a coupling state. Each of the elements of the first planetary gear mechanism PG1 is set in a locked state at which relative rotation is disabled, and the third driven gear G3b is fixed to the output member 3. The rotational speed of the input shaft 2 is changed to 1/c, the output member 3 is rotated, and the sixth gear is thus established.

To establish the reverse gear, the third engagement mechanism C3 is set in a coupling state, and the first fixing mechanism B1 is set in a fixing state. The second driven gear G2b is fixed to the output member 3, the ring gear Ra is rotated at $-1/h$, and the output member 3 is rotated at 1/ch, and the reverse gear is thus established.

At each of the first to sixth gears, HEV running in which the driving force of the motor MG assists in the driving force of the driving source being the internal-combustion engine and regeneration in which a secondary battery (not illustrated) is charged by power generated by the motor MG can also be performed.

To perform EV running in which a vehicle runs depending solely on the driving force of the motor MG without using the driving force of the driving source being the internal-combustion engine, the first engagement mechanism C1 can be set in a coupling state. Regeneration can also be achieved by causing only the second engagement mechanism C2 to be set in a coupling state and rotating the motor MG by use of the driving source when the vehicle is standing still.

FIG. 11 illustrates how each of the engagement mechanisms C1 to C4 and the fixing mechanisms B1 and B2 is set at each gear according to the fourth embodiment. In the table, a circle indicates a coupling state or a fixing state, and a blank field indicates an open state. For the fourth embodiment, the fourth gear corresponds to a specific medium-speed gear, the range from the first gear to the fourth gear corresponds to a low-speed gear range, and the range of the fifth and sixth gears corresponds to a high-speed gear range.

With the automatic transmission according to the fourth embodiment, six forward gears and one reverse gear can be achieved. In the high-speed gear range of the fifth and sixth gears, where the output member 3 is rotated at a rotational speed higher than or equal to that of the driving source, the first engagement mechanism C1 is in an open state. Therefore, in the high-speed gear range, the rotational speed of the output member 3 can be prevented from being directly transferred to the motor MG. Additionally, at all of the first to sixth gears, the rotational speed of the carrier Ca (second element) of the first planetary gear mechanism PG1 to which the driving force of the motor MG is transferred is smaller than or equal to that of the input shaft 2 being rotated by the driving source. Accordingly, excessive rotation of the motor MG can be prevented.

With the embodiments of the present invention, the transfer mechanism is set in the transfer state in the low-speed gear range from the first gear to the specific medium-speed gear and is set in the open state in the high-speed gear range exceeding the specific medium-speed gear. When the transfer mechanism is in the transfer state, the motor and the output member are in a direct-coupled state at which power can be transferred therebetween. In contrast, when the transfer mechanism is in the open state, the motor and the output member are in an indirect-coupled state at which power is transferred through the planetary gear mechanism. The motor connection element to which the motor can transfer power is configured to be rotated more slowly than the input shaft at all of the gears.

Accordingly, in the high-speed gear range, where the output member is rotated at high speed, because the motor and the output member are in the above-described indirect-coupled state, the motor can be prevented from being excessively rotated by high-speed rotation of the output member. The transfer mechanism also serves as the engagement mechanism used to establish each gear in the low-speed gear range. Accordingly, unlike related-art examples, an engagement mechanism dedicated to the motor is not necessary, and excessive rotation of the motor can be prevented by employing the transfer mechanism used for establishing each gear in the low-speed gear range. Thus the size and weight of the automatic transmission can be reduced.

Even in the indirect-coupled state, the motor can transfer power to the output member through the planetary gear mechanism. Therefore, hybrid electric vehicle (HEV) running in which the motor assists in the driving force of the driving source and regeneration of charging a secondary battery by power generated by the motor can be achieved at all of the gears.

According to a first concrete mode of the embodiments of the present invention, the output member may be an output shaft arranged substantially in parallel with the input shaft. The at least one planetary gear mechanism included in the transmission unit may include first to third planetary gear mechanisms each having the three elements of the sun gear, the carrier, and the ring gear. The transmission unit may further include a first gear train including a first driving gear and a first driven gear meshing therewith and a second gear train including a second driving gear and a second driven gear meshing therewith. When the elements of the first planetary gear mechanism arranged at intervals corresponding to a gear ratio in an alignment chart are assigned as a first element, a second element, and a third element in sequence, the elements of the second planetary gear mechanism arranged at intervals corresponding to the gear ratio in the alignment chart are assigned as a fourth element, a fifth element, and a sixth element in sequence, and the elements of the third planetary gear mechanism arranged at intervals corresponding to the gear ratio in the alignment chart are assigned as a seventh element, an eighth element, and a ninth element in sequence, the first driving gear may be coupled to the second element and the first driven gear may be rotatably supported by the output shaft, or the first driving gear may be rotatably supported by the second element and the first driven gear may be coupled to the output shaft, the second driving gear may be coupled to the seventh element, the second driven gear may be coupled to the output shaft, the first element may be coupled to the input shaft, the third element and the fifth element may be coupled to form a first coupling member, and the sixth element and the ninth element may be coupled to form a second coupling member.

The automatic transmission may include a first engagement mechanism capable of switching between a coupling state of coupling the second element and the first driving gear rotatably supported by the second element and an open state of disconnecting the coupling therebetween or switching between a coupling state of coupling the output shaft and the first driven gear rotatably supported by the output shaft and an open state of releasing the coupling therebetween, a second engagement mechanism capable of switching between a coupling state of coupling the first element and the eighth element and an open state of disconnecting the coupling therebetween, a third engagement mechanism capable of switching between a coupling state of coupling the second coupling member and the second element and an open state of disconnecting the coupling therebetween, a first fixing mechanism capable of switching between a fixing state of fixing the first coupling member to a transmission case and an open state of releasing the fixation thereof, and a second fixing mechanism capable of switching between a fixing state of fixing the fourth element to the transmission case and an open state of releasing the fixation. The motor connection element may be the second element, the transfer mechanism may be the first engagement mechanism capable of transferring power between the second element and the output shaft through the first gear train, and the transmission-unit output element may be the seventh element capable of transferring power to the output shaft through the second gear train.

With the first concrete mode of the embodiments of the present invention, as is clear from the description of embodiments described below, seven forward gears can be achieved, and excessive rotation of the motor can be prevented without using an engagement mechanism dedicated to the motor. At all of the gears, rotation of the input shaft is transferred to the output shaft being the output member through the first gear train or second gear train. Therefore, the gear ratio at each gear can be readily changed by adjustment of the gear ratio (the ratio of the number of teeth of the driven gear to that of the driving gear) of each of the two gear trains. Thus the degree of flexibility in setting the gear ratio at each gear can be improved.

According to a second concrete mode of the embodiments of the present invention, the at least one planetary gear mechanism included in the transmission unit may include first to third planetary gear mechanisms each having the three elements of the sun gear, the carrier, and the ring gear. When the elements of the first planetary gear mechanism arranged at intervals corresponding to a gear ratio in an alignment chart are assigned as a first element, a second element, and a third element in sequence, the elements of the second planetary gear mechanism arranged at intervals corresponding to the gear ratio in the alignment chart are assigned as a fourth element, a fifth element, and a sixth element in sequence, and the elements of the third planetary gear mechanism arranged at intervals corresponding to the gear ratio in the alignment chart are assigned as a seventh element, an eighth element, and a ninth element in sequence, the first element may be coupled to the input shaft, the seventh element may be coupled to the output member, the third element and the fifth element may be coupled to form a first coupling member, and the sixth element and the ninth element may be coupled to form a second coupling member. The automatic transmission may include a first engagement mechanism capable of switching between a coupling state of coupling the second element and the seventh element and an open state of disconnecting the coupling therebetween, a second engagement mechanism capable of switching between a coupling state of coupling the first element and the eighth element and an open state of disconnecting the coupling therebetween, a third engagement mechanism capable of switching between a coupling state of coupling the second coupling member and the second element and an open state of disconnecting the coupling therebetween, a first fixing mechanism capable of switching between a fixing state of fixing the first coupling member to a transmission case and an open state of releasing the fixation thereof, and a second fixing mechanism capable of switching between a fixing state of fixing the fourth element to the transmission case and an open state of releasing the fixation thereof. The motor connection element may be the second element, the transfer mechanism may be the first engagement mechanism, and the transmission-unit output element may be the seventh element.

Also with the second concrete mode of the embodiments of the present invention, excessive rotation of the motor can be prevented, and, as is clear from the description of embodiments described below, seven forward gears can be achieved.

In the first and second concrete modes of the embodiments of the present invention, the automatic transmission may preferably include a third engagement mechanism capable of switching between a fixing state of fixing the eighth element to the transmission case and an open state of releasing the fixation thereof. With this, as is clear from the description of embodiments described below, eight forward gears can be achieved.

According to a third concrete mode of the embodiments of the present invention, the at least one planetary gear mechanism included in the transmission unit may include first and second planetary gear mechanisms. When the elements of the first planetary gear mechanism arranged at intervals corresponding to a gear ratio in an alignment chart are assigned as a first element, a second element, and a third element in sequence, and the elements of the second planetary gear mechanism arranged at intervals corresponding to the gear ratio in the alignment chart are assigned as a fourth element, a fifth element, and a sixth element in sequence, power of the input shaft may be transferred to the first element, the fourth element may be coupled to the output member, and the third element and the fifth element may be coupled to form a first coupling member.

The automatic transmission may include a first engagement mechanism capable of switching between a coupling state of coupling the second element and the fourth element and an open state of disconnecting the coupling therebetween, a second engagement mechanism capable of switching between a coupling state of coupling any two of the three elements of the first to third elements from the first planetary gear mechanism and an open state of disconnecting the coupling therebetween, a third engagement mechanism capable of switching between a coupling state of coupling the first element and the sixth element and an open state of disconnecting the coupling therebetween, a first fixing mechanism capable of fixing the first coupling member to a transmission case, and a second fixing mechanism capable of switching between a fixing state of fixing the sixth element to the transmission case and an open state of releasing the fixation thereof. The motor connection element may be the second element, the transfer mechanism may be the first engagement mechanism, and the transmission-unit output element may be the fourth element.

For the third concrete mode of the embodiments of the present invention, the rotation of the input shaft may be transferred to the first element through an input unit capable of changing the speed of the rotation of the input shaft. With this, six forward gears can be achieved.

For the third concrete mode of the embodiments of the present invention, the first engagement mechanism may include a meshing mechanism, the first fixing mechanism may include a two-way clutch, the automatic transmission may preferably further include a starting clutch capable of adjusting an amount of a driving force transferred to the first element.

With this, friction loss can be reduced. The amount of the driving force transferred to the first element can be adjusted by the starting clutch. Therefore, without causing engine stalling, the first engagement mechanism can be in the coupling state, and the first coupling member can be fixed to the transmission case by the first fixing mechanism. Thus one gear can be established.

According to a fourth concrete mode of the embodiments of the present invention, the output member may be an output shaft arranged substantially in parallel with the input shaft. The transmission unit may further include a first gear train including a first driving gear and a first driven gear meshing therewith and a second gear train including a second driving gear and a second driven gear meshing therewith. When the elements of the planetary gear mechanism arranged at intervals corresponding to a gear ratio in an alignment chart are assigned as a first element, a second element, and a third element in sequence, the first element may be coupled to the input shaft, the first driving gear may be coupled to the second element and the first driven gear may be rotatably supported by the output shaft, or the first driving gear may be rotatably supported by the second element and the first driven gear may be coupled to the output shaft. The second driving gear may be coupled to the third element and the second driven gear may be rotatably supported by the output shaft, or the second driving gear may be rotatably supported by the third element and the second driven gear may be coupled to the output shaft.

The automatic transmission may include a first engagement mechanism capable of switching between a coupling state of coupling the output shaft and the first driven gear rotatably supported by the output shaft and an open state of disconnecting the coupling therebetween or switching between a coupling state of coupling the second element and the first driving gear rotatably supported by the second element and an open state of disconnecting the coupling therebetween, a second engagement mechanism capable of switching between a coupling state of coupling any two of the three elements of the first to third elements and an open state of disconnecting the coupling therebetween, a third engagement mechanism capable of switching between a coupling state of coupling the output shaft and the first driven gear rotatably supported by the output shaft and an open state of disconnecting the coupling therebetween or switching between a coupling state of coupling the third element and the first driving gear rotatably supported by the third element and an open state of disconnecting the coupling therebetween, a first fixing mechanism capable of switching between a fixing state of fixing the second element to a transmission case and an open state of releasing the fixation thereof, and a second fixing mechanism capable of switching between a fixing state of fixing the third element to the transmission case and an open state of releasing the fixation thereof. The motor connection element may be the second element, the transfer mechanism may be the first engagement mechanism, and the transmission-unit output element may be the third element capable of transferring power to the output shaft through the second gear train when the third engagement mechanism is set in the coupling state.

The automatic transmission according to the embodiments of the present invention may preferably further include a reduction mechanism that reduces a speed of rotation of the motor in transferring the rotation to the second element. With this, output torque of the motor can be increased.

Obviously, numerous modifications and variations of the present invention are possible in light of the above teachings. It is therefore to be understood that within the scope of the appended claims, the invention may be practiced otherwise than as specifically described herein.

What is claimed is:

1. An automatic transmission comprising:
an input shaft rotatable by power from a driving source;
a transmission unit capable of changing a speed of rotation of the input shaft to any one of a plurality of speeds at gears, the transmission unit comprising at least one planetary gear mechanism having three elements of a sun gear, a carrier, and a ring gear, one element among the three elements comprising a transmission-unit output element to transfer the power, another element among the three elements comprising a motor connection element to receive power from a motor, the motor connection element being rotated at an equal speed or a lower speed compared with the input shaft at all the gears;
an output member to output the power transferred from the transmission-unit output element with a speed changed by the transmission unit; and
a transfer mechanism to switch between a transfer state at which a transfer of power is performed between the motor connection element and the output member and an open state at which the transfer is not performed, the transfer mechanism being in the transfer state in a low-speed gear range from a first gear to a specific medium-speed gear among the gears to establish each of the gears in the low-speed gear range and in the open state in a high-speed gear range exceeding the specific medium-speed gear.

2. The automatic transmission according to claim 1, further comprising a reduction mechanism configured to reduce a speed of rotation of the motor in transferring the rotation to the elements of the planetary gear mechanism.

3. The automatic transmission according to claim 1, wherein the transfer mechanism can transmit power of the motor to the output member by only engaging the transfer mechanism.

4. The automatic transmission according to claim 1, wherein the transfer mechanism can transmit power of the motor directly to the output member by only engaging the transfer mechanism.

5. The automatic transmission according to claim 1, wherein the transfer mechanism is directly connected to the output member.

6. The automatic transmission according to claim 1, wherein, in the open state, the motor is not engaged to the output member.

7. The automatic transmission according to claim 1,
wherein the at least one planetary gear mechanism included in the transmission unit comprises first to third planetary gear mechanisms each having the three elements of the sun gear, the carrier, and the ring gear, and
wherein the elements of the first planetary gear mechanism arranged at intervals corresponding to a gear ratio are respectively assigned as a first element, a second element, and a third element in sequence, the elements of the second planetary gear mechanism arranged at intervals corresponding to the gear ratio are respectively assigned as a fourth element, a fifth element, and a sixth element in sequence, and the elements of the third planetary gear mechanism arranged at intervals corresponding to the gear ratio are respectively assigned as a seventh element, an eighth element, and a ninth element in sequence,
wherein the first element is coupled to the input shaft, the seventh element is coupled to the output member, the third element and the fifth element are coupled to form a first coupling member, and the sixth element and the ninth element are coupled to form a second coupling member,
wherein the automatic transmission comprises
a first engagement mechanism capable of switching between a coupling state of coupling the second element and the seventh element and an open state of disconnecting coupling of the second element and the seventh element,
a second engagement mechanism capable of switching between a coupling state of coupling the first element and the eighth element and an open state of disconnecting coupling of the first element and the eighth element,
a third engagement mechanism capable of switching between a coupling state of coupling the second coupling member and the second element and an open state of disconnecting coupling of the second coupling member and the second element,
a first fixing mechanism capable of switching between a fixing state of fixing the first coupling member to a transmission case and an open state of releasing fixation of the first coupling member to the transmission case, and
a second fixing mechanism capable of switching between a fixing state of fixing the fourth element to the transmission case and an open state of releasing fixation of the fourth element to the transmission case,
wherein the motor connection element comprises the second element,
wherein the transfer mechanism comprises the first engagement mechanism, and
wherein the transmission-unit output element comprises the seventh element.

8. The automatic transmission according to claim 7, further comprising a reduction mechanism configured to reduce a speed of rotation of the motor in transferring the rotation to the elements of the planetary gear mechanism.

9. The automatic transmission according to claim 1,
wherein the output member is an output shaft arranged substantially in parallel with the input shaft,
wherein the at least one planetary gear mechanism included in the transmission unit comprises first to third planetary gear mechanisms each having the three elements of the sun gear, the carrier, and the ring gear,
wherein the transmission unit further comprises
a first gear train comprising a first driving gear and a first driven gear meshing with the first driving gear, and
a second gear train comprising a second driving gear and a second driven gear meshing with the second driving gear,
wherein the elements of the first planetary gear mechanism arranged at intervals corresponding to a gear ratio are respectively assigned as a first element, a second element, and a third element in sequence, the elements of the second planetary gear mechanism arranged at intervals corresponding to the gear ratio are respectively assigned as a fourth element, a fifth element, and a sixth element in sequence, and the elements of the third planetary gear mechanism arranged at intervals corresponding to the gear ratio are respectively assigned as a seventh element, an eighth element, and a ninth element in sequence,
wherein the first driving gear is coupled to the second element and the first driven gear is rotatably supported by the output shaft, or the first driving gear is rotatably supported by the second element and the first driven gear is coupled to the output shaft,
wherein the second driving gear is coupled to the seventh element,
wherein the second driven gear is coupled to the output shaft,
wherein the first element is coupled to the input shaft, the third element and the fifth element are coupled to form a first coupling member, and the sixth element and the ninth element are coupled to form a second coupling member,
wherein the automatic transmission comprises
a first engagement mechanism capable of switching between a coupling state of coupling the second element and the first driving gear rotatably supported by the second element and an open state of disconnecting coupling of the second element and the first driving gear or switching between a coupling state of coupling the output shaft and the first driven gear rotatably supported by the output shaft and an open state of releasing coupling of the output shaft and the first driven gear, a second engagement mechanism capable of switching between a coupling state of coupling the first element and the eighth element and an open state of disconnecting coupling of the first element and the eighth element, a third engagement mechanism capable of switching between a coupling state of coupling the second coupling member and the second element and an open state of disconnecting coupling of the second coupling member and the second element, a first fixing mechanism capable of switching between a fixing state of fixing the first coupling member to a transmission case and an open state of releasing fixation of the first coupling member to the transmission case, and a second fixing mechanism capable of switching between a fixing state of fixing the fourth element to the transmission case and an open state of releasing fixation of the fourth element to the transmission case, wherein the motor connection element comprises the second element, wherein the transfer mechanism comprises the first engagement mechanism capable of transferring power between the second element and the output shaft through the first gear train, and wherein the transmission-unit output element comprises the seventh element capable of transferring power to the output shaft through the second gear train.

10. The automatic transmission according to claim 9, further comprising a third engagement mechanism capable of switching between a fixing state of fixing the eighth element to the transmission case and an open state of releasing fixation of the eighth element to the transmission case.

11. The automatic transmission according to claim 10, further comprising a reduction mechanism configured to reduce a speed of rotation of the motor in transferring the rotation to the elements of the planetary gear mechanism.

12. The automatic transmission according to claim 9, further comprising a reduction mechanism configured to reduce a speed of rotation of the motor in transferring the rotation to the elements of the planetary gear mechanism.

13. The automatic transmission according to claim 1,
wherein the at least one planetary gear mechanism included in the transmission unit comprises first and second planetary gear mechanisms,
wherein the elements of the first planetary gear mechanism arranged at intervals corresponding to a gear ratio are respectively assigned as a first element, a second element, and a third element in sequence, and the elements of the second planetary gear mechanism arranged at intervals corresponding to the gear ratio are respectively assigned as a fourth element, a fifth element, and a sixth element in sequence,
wherein power of the input shaft is transferred to the first element,
wherein the fourth element is coupled to the output member,
wherein the third element and the fifth element are coupled to form a first coupling member,
wherein the automatic transmission comprises
a first engagement mechanism capable of switching between a coupling state of coupling the second element and the fourth element and an open state of disconnecting coupling of the second element and the fourth element,
a second engagement mechanism capable of switching between a coupling state of coupling any two of the three elements of the first to third elements from the first planetary gear mechanism and an open state of disconnecting coupling of the any two of the three elements of the first to third elements,
a third engagement mechanism capable of switching between a coupling state of coupling the first element and the sixth element and an open state of disconnecting coupling of the first element and the sixth element,
a first fixing mechanism capable of fixing the first coupling member to a transmission case, and
a second fixing mechanism capable of switching between a fixing state of fixing the sixth element to the transmission case and an open state of releasing fixation of the sixth element to the transmission case,
wherein the motor connection element comprises the second element,
wherein the transfer mechanism comprises the first engagement mechanism, and
wherein the transmission-unit output element comprises the fourth element.

14. The automatic transmission according to claim 13, further comprising a reduction mechanism configured to reduce a speed of rotation of the motor in transferring the rotation to the elements of the planetary gear mechanism.

15. The automatic transmission according to claim 13, wherein the rotation of the input shaft is transferred to the first element through an input unit capable of changing a speed of rotation of the input shaft.

16. The automatic transmission according to claim 15, further comprising a reduction mechanism configured to reduce a speed of rotation of the motor in transferring the rotation to the elements of the planetary gear mechanism.

17. The automatic transmission according to claim 13,
wherein the first engagement mechanism comprises a meshing mechanism,
wherein the first fixing mechanism comprises a two-way clutch, and
wherein the automatic transmission further comprises a starting clutch capable of adjusting an amount of a driving force transferred to the first element.

18. The automatic transmission according to claim 17, further comprising a reduction mechanism configured to reduce a speed of rotation of the motor in transferring the rotation to the elements of the planetary gear mechanism.

19. The automatic transmission according to claim 1,
wherein the output member comprises an output shaft arranged substantially in parallel with the input shaft,
wherein the transmission unit further comprises
a first gear train comprising a first driving gear and a first driven gear meshing with the first driving gear, and
a second gear train including a second driving gear and a second driven gear meshing with the second driving gear,
wherein the elements of the planetary gear mechanism arranged at intervals corresponding to a gear ratio are respectively assigned as a first element, a second element, and a third element in sequence,
wherein the first element is coupled to the input shaft,
wherein the first driving gear is coupled to the second element and the first driven gear is rotatably supported by the output shaft, or the first driving gear is rotatably supported by the second element and the first driven gear is coupled to the output shaft,
wherein the second driving gear is coupled to the third element and the second driven gear is rotatably supported by the output shaft, or the second driving gear is rotatably supported by the third element and the second driven gear is coupled to the output shaft wherein the automatic transmission comprises
- a first engagement mechanism capable of switching between a coupling state of coupling the output shaft and the first driven gear rotatably supported by the output shaft and an open state of disconnecting coupling of the output shaft and the first driven gear or switching between a coupling state of coupling the second element and the first driving gear rotatably supported by the second element and an open state of disconnecting coupling of the second element and the first driving gear,
- a second engagement mechanism capable of switching between a coupling state of coupling any two of the three elements of the first to third elements and an open state of disconnecting coupling of the any two of the three elements of the first to third elements,
- a third engagement mechanism capable of switching between a coupling state of coupling the output shaft and the first driven gear rotatably supported by the output shaft and an open state of disconnecting coupling of the output shaft and the first driven gear or switching between a coupling state of coupling the third element and the first driving gear rotatably supported by the third element and an open state of disconnecting coupling of the third element and the first driving gear,
- a first fixing mechanism capable of switching between a fixing state of fixing the second element to a transmission case and an open state of releasing fixation of the second element to the transmission case, and
- a second fixing mechanism capable of switching between a fixing state of fixing the third element to the transmission case and an open state of releasing fixation of the third element to the transmission case, wherein the motor connection element comprises the second element, wherein the transfer mechanism comprises the first engagement mechanism, and wherein the transmission-unit output element comprises the third element capable of transferring power to the output shaft through the second gear train when the third engagement mechanism is set in the coupling state.

20. The automatic transmission according to claim 19, further comprising a reduction mechanism configured to reduce a speed of rotation of the motor in transferring the rotation to the elements of the planetary gear mechanism.

* * * * *